United States Patent
Ishizuka et al.

(10) Patent No.: US 7,550,183 B2
(45) Date of Patent: Jun. 23, 2009

(54) METHOD FOR MANUFACTURING CONDUCTIVE ELEMENT SUBSTRATE, CONDUCTIVE ELEMENT SUBSTRATE, METHOD FOR MANUFACTURING LIQUID CRYSTAL DISPLAY, LIQUID CRYSTAL DISPLAY AND ELECTRONIC INFORMATION EQUIPMENT

(75) Inventors: Kazuhiro Ishizuka, Nara (JP); Takashi Fujikawa, Nara (JP); Takehiko Sakai, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 532 days.

(21) Appl. No.: 11/060,677

(22) Filed: Feb. 18, 2005

(65) Prior Publication Data

US 2005/0186359 A1 Aug. 25, 2005

(30) Foreign Application Priority Data

Feb. 19, 2004 (JP) ............................. 2004-043711
Mar. 29, 2004 (JP) ............................. 2004-096823
Feb. 17, 2005 (JP) ............................. 2005-041149

(51) Int. Cl.
*G02F 1/155* (2006.01)
*G02F 1/1343* (2006.01)

(52) U.S. Cl. .................. 428/1.4; 428/1.51; 216/95; 438/749; 438/978; 349/139

(58) Field of Classification Search ......... 216/100–101, 216/23–24, 41, 49, 83, 91–92, 108, 95; 428/1.1, 428/1.5, 1.4; 349/139; 257/761, 763–765, 257/771; 438/748–751, 978
See application file for complete search history.

(56) References Cited

U.S. PATENT DOCUMENTS

| | | | | |
|---|---|---|---|---|
| 4,665,008 A | * | 5/1987 | Nishiura et al. | 430/314 |
| 4,838,656 A | * | 6/1989 | Stoddard | 349/150 |
| 4,859,036 A | * | 8/1989 | Yamanaka et al. | 349/147 |
| 5,528,082 A | * | 6/1996 | Ho et al. | 257/775 |
| 5,764,324 A | | 6/1998 | Lu et al. | |
| 6,184,960 B1 | | 2/2001 | Sawayama et al. | |
| 6,338,988 B1 | * | 1/2002 | Andry et al. | 438/158 |
| 6,433,842 B1 | * | 8/2002 | Kaneko et al. | 349/43 |
| 6,567,145 B1 | * | 5/2003 | Kaneko et al. | 349/139 |
| 6,600,907 B1 | | 7/2003 | Taguchi | |
| 7,012,029 B2 | * | 3/2006 | Katoh et al. | 438/738 |

(Continued)

FOREIGN PATENT DOCUMENTS

JP 3-105325 A 5/1991

(Continued)

*Primary Examiner*—Keith D Hendricks
*Assistant Examiner*—Sophie Hon
(74) *Attorney, Agent, or Firm*—Nixon & Vanderhye P.C.

(57) ABSTRACT

A method for manufacturing a liquid crystal display which employs an active matrix substrate including a plurality of pixels arranged in matrix on a substrate and reflecting electrodes formed in the pixels, respectively. The method comprises (a) a laminated conductive film formation step of sequentially forming a conductive metal film and an amorphous transparent conductive film on a substrate to form a laminated conductive film and (b) a reflecting electrode formation step of patterning the laminated conductive film into a reflecting electrode, wherein the step (b) includes a first etching step of etching the conductive metal film and the amorphous transparent conductive film simultaneously and a second etching step of etching the amorphous transparent conductive film only.

20 Claims, 20 Drawing Sheets

U.S. PATENT DOCUMENTS

| | | |
|---|---|---|
| 7,115,913 B2 * | 10/2006 | Shigeno ................... 257/91 |
| 7,411,211 B1 * | 8/2008 | Yamazaki ................. 257/59 |
| 2002/0055447 A1 * | 5/2002 | Ishikawa et al. ........... 510/175 |
| 2002/0070197 A1 * | 6/2002 | Ahn et al. ................. 216/13 |
| 2002/0176032 A1 * | 11/2002 | Maeda et al. .............. 349/43 |
| 2003/0081160 A1 | 5/2003 | Ihida et al. |
| 2003/0086046 A1 | 5/2003 | You |
| 2003/0156240 A1 | 8/2003 | Oda et al. |
| 2003/0164912 A1 | 9/2003 | Eguchi et al. |
| 2004/0036835 A1 * | 2/2004 | Lee et al. ................. 349/187 |
| 2004/0141116 A1 | 7/2004 | You |
| 2004/0171200 A1 | 9/2004 | Maeda et al. |
| 2006/0060890 A1 | 3/2006 | You |
| 2006/0132685 A1 | 6/2006 | You |

FOREIGN PATENT DOCUMENTS

| | | |
|---|---|---|
| JP | 05-019291 | 1/1993 |
| JP | 10-81981 A | 3/1998 |
| JP | 10-206845 | 8/1998 |
| JP | 2000-148042 | 5/2000 |
| JP | 2001-318389 | 11/2001 |
| JP | 2002-352627 | 12/2002 |
| JP | 2003-043509 | 2/2003 |
| JP | 2003-186415 | 7/2003 |
| JP | 2004-191958 | 7/2004 |

* cited by examiner

METHOD FOR MANUFACTURING CONDUCTIVE ELEMENT SUBSTRATE, CONDUCTIVE ELEMENT SUBSTRATE, METHOD FOR MANUFACTURING LIQUID CRYSTAL DISPLAY, LIQUID CRYSTAL DISPLAY AND ELECTRONIC INFORMATION EQUIPMENT

CROSS-REFERENCE TO RELATED APPLICATIONS

This non-provisional application claims priority under 35 U.S.C. §119(a) on Japanese Patent Applications Nos. 2004-43711 filed on Feb. 19, 2004, 2004-96823 filed on Mar. 29, 2004 and 2005-041149 filed on Feb. 17, 2005 the entire contents of which are hereby incorporated by reference.

BACKGROUND OF THE INVENTION (a) Field of the Invention

The present invention relates to a method for manufacturing a conductive element substrate. In particular, it relates to a method for manufacturing reflecting electrodes on an active matrix substrate for forming a liquid crystal display.

(b) Description of Related Art

Semi-transmissive liquid crystal displays, which are one of liquid crystal displays, are capable of displaying in both transmissive and reflective modes. The semi-transmissive liquid crystal displays are given with a feature of a transmissive liquid crystal display such as high visibility in dark place owing to a backlight installed therein and a feature of a reflective liquid crystal display such as power saving by using ambient light.

A common liquid crystal display includes an active matrix substrate on which a plurality of pixel electrodes and TFTs (thin film transistors) are arranged in matrix configuration, a counter substrate provided with common electrodes and a liquid crystal layer sandwiched between the substrates. By writing certain charge to each of the pixel electrodes, a certain voltage is applied to a liquid crystal capacitor constituted of the liquid crystal layer between the pixel electrode and the common electrode. Visual display is achieved by making use of changes in orientation of liquid crystal molecules in response to the applied voltage.

In the semi-transmissive liquid crystal display, each of the pixel electrodes, which constitutes a minimum unit called pixel for forming a visual image, is formed of a transparent electrode and a reflecting electrode. The transparent electrode allows light from the backlight to pass through to execute display in the transmissive mode, while the reflecting electrode reflects ambient light to execute display in the reflective mode.

The transparent electrode is made of a transparent conductive film such as a tin oxide film, a zinc oxide film, an ITO (Indium Tin Oxide) film made of a compound of indium oxide and tin oxide and an IZO (Indium Zinc Oxide) film made of a compound of indium oxide and zinc oxide. In particular, the ITO film and the IZO film have been commonly used because of their excellent visible light transmission and favorable conductivity.

As the reflecting electrode, a conductive metal film such as an aluminum film has been commonly used because of its high reflectance and low electrical resistance.

In general, electrode materials such as the transparent conductive film and the conductive metal film described above have different work functions. Therefore, the transparent electrode and the reflecting electrode made of different materials will have different work functions. In this case, the transparent and reflecting electrodes show different electrode potentials, which possibly leads to defective display. The reason therefor is described below.

Considering the lifetime of liquid crystal molecules, liquid crystal displays are AC-driven to alternate the polarity of voltage applied to the liquid crystal layer. However, if the voltage applied to the liquid crystal layer is distorted by parasitic capacitance of TFTs or the like, a direct voltage may possibly be applied to the liquid crystal layer. Therefore, it is also necessary to apply an offset voltage to the liquid crystal layer.

The offset voltage is given only to the whole pixels and cannot be applied one by one. Therefore, if the reflecting electrode and the transparent electrode are different in electrode potential as described above, the offset voltage is given only to one of the electrodes. In such a case, a direct voltage is applied to the liquid crystal layer to cause variations in light intensity (flicker), resulting in significant decrease in display quality.

To solve the defective display (display misalignment) derived from the difference in work function, attempts have been made to equalize the work functions of the materials for the reflective electrode and the transparent electrode.

For example, paying attention to the work functions of electrode materials, Japanese Unexamined Patent Publication HEI10-206845 describes a technique of reducing flicker of a reflective liquid crystal display by providing a common electrode and a reflecting electrode (pixel electrode) sandwiching a liquid crystal layer with an almost equal work function.

Further, for a semi-transmissive liquid crystal display including a transparent electrode made of an ITO film and a reflecting electrode made of an aluminum film, there has been a known technique of forming a transparent conductive film having a work function close to that of the ITO film on the aluminum film, thereby equalizing the work functions of an electrode material at the reflective electrode surface and an electrode material at the transparent electrode surface.

To prevent the occurrence of display misalignment between the reflective mode and the transmissive mode, an IZO film having a work function close to that of the ITO film is formed on the aluminum film forming the reflecting electrode in a pixel. The reason why the ITO film is not formed on the aluminum film is that the aluminum film and the ITO film bring about electrolytic corrosion when they come into to contact in the course of electrode formation and the ITO film is dropped off.

The provision of the IZO film as an uppermost layer of the reflecting electrode is advantageous in that the IZO film is a transparent conductive film and does not hinder the function of the aluminum film as the reflecting electrode, the work function of the IZO film is close to that of the opposed transparent electrode and the IZO film can be patterned with an etchant used for etching the underlying aluminum film.

On the substrate provided with the reflecting electrodes (pixel electrodes), other various metal wires are formed. For example, a driver (drive circuit) is formed at the end of the substrate to input a drive signal from outside. A contact terminal electrode is also formed at the end of the substrate to connect the driver and a wire for feeding a voltage to the pixel electrodes. As an uppermost layer of the contact terminal electrode, an ITO film having stability to air and low contact resistance is used. If wires and electrodes made of an aluminum film are formed on the substrate provided with the ITO film of the contact terminal electrode, electrolytic corrosion occurs upon contact between the aluminum film and the ITO film as described above. As a result, the ITO film comes off.

To solve the problem of electrolytic corrosion caused by contact between the aluminum film and the ITO film, a molybdenum film is formed as a protective metal film between the aluminum film and the ITO film.

It has been known that there is no need to use different etchants to etch the aluminum film and the molybdenum film because they can be patterned with the same etchant (e.g., a mixed solution of nitric acid, phosphoric acid, acetic acid and water). For example, Japanese Unexamined Patent Publication No. 2000-148042 discloses a method for patterning a two-layered film made of an aluminum film and a molybdenum film by spraying a single etchant thereon in the film thickness direction such that the patterned film is substantially tapered upward when viewed in cross section.

Further, it has also been known that the IZO film, aluminum film and molybdenum film can be patterned with the same etchant (e.g., a mixed solution of nitric acid, phosphoric acid, acetic acid and water) and there is no need of using different etchants for each of the layers.

As described above, from the viewpoints of visible light transmission, conductivity and compatibility with the underlying aluminum film (in respect of etching and electrolytic corrosion), an amorphous IZO film is suitably used as the transparent conductive film formed on the aluminum film serving as the reflecting electrode.

However, if a conductive metal film (aluminum film) and an amorphous transparent conductive film (IZO film) are formed in sequence and then the laminated conductive film including these two films are etched using a patterned resist as a mask, the edge portions of an upper amorphous transparent conductive layer 6b" may possibly remain protruding more outward than the edge portions of a conductive metal layer 6a as shown in a schematic sectional view of FIG. 45.

This is presumably because of the nature of the IZO film which is less likely to be etched by a weakly acid etchant used for etching the aluminum film than the aluminum film.

Specifically, when an IZO layer is formed as an uppermost layer to prevent display misalignment, an aluminum layer is formed as a middle layer serving as the reflecting electrode and a molybdenum layer is formed as an undermost layer to prevent electrolytic corrosion, the middle aluminum layer and the undermost molybdenum layer are etched faster than the uppermost IZO layer. Therefore, if these layers are patterned at one time using the same etchant, the resulting layered structure shows a cross section which is substantially tapered downward from the farthest layer from the substrate as shown in a sectional view of FIG. 46. Thus, the IZO layer is reduced in strength and likely to come off.

Referring to FIG. 46, the molybdenum layer 102, the aluminum layer 103 and the IZO layer 104 are formed on a glass substrate 101 in this order. The middle aluminum layer 103 is so patterned that its cross section becomes narrower than that of the uppermost IZO layer 104. Detailed explanation about this phenomenon is given with reference to FIGS. 47 to 52.

Referring to FIG. 47, an uppermost IZO film 104, a middle aluminum film 103 and an undermost molybdenum film 103 are formed on the glass substrate 101 to form a three-layered structure. On the uppermost IZO film 104, a resist layer 105 patterned in a desired configuration is formed. If these films are etched in this state, the IZO film 104, aluminum film 103 and molybdenum film 102 are etched almost isotropically.

As shown in FIG. 48, the uppermost IZO film 104 is first etched in the thickness direction. Then, after the etching of the IZO film 104 is finished, the aluminum film 103 is etched in the thickness direction and at the same time, the IZO film 104 is etched in the horizontal direction as shown in FIG. 49.

After the etching of the aluminum film 103 is completed, the molybdenum film 102 is etched in the thickness direction and at the same time, the aluminum film 103 is etched in the horizontal direction. At this time, since the aluminum film 103 and the molybdenum film 102 are much higher in etch rate in both of the thickness and horizontal directions than the IZO film 104 in the horizontal direction, the etching of the aluminum film 103 and the molybdenum film 102 proceeds much faster in both of the thickness and horizontal directions than the etching of the IZO film 104 in the horizontal direction. FIGS. 48 to 50 indicate the degree of etch rate by the number of arrows.

When the etching of the molybdenum film 102 in the thickness direction is completed, the resulting aluminum layer 103 and molybdenum layer 102 are more narrowed in the horizontal direction than the uppermost IZO layer 104 as shown in FIG. 51.

FIG. 52 is a sectional view illustrating the layered structure after the removal of the resist film 105. By any etching method (showering, dipping, combination of showering/dipping), the underlying aluminum layer 103 and molybdenum layer 102 which have been etched at a higher etch rate are more narrowed when viewed in cross section than the IZO layer 104 which has been etched at a lower etch rate, as shown in FIG. 52. Thus, the resulting layered structure is substantially tapered downward from the farthest layer from the substrate.

If the edge portions of an amorphous transparent conductive layer 6b" (the IZO layer 104) for forming the reflecting electrode remain protruding more outward than the edge portions of the underlying layer, the edge portions of the amorphous transparent conductive layer 6b" may possibly come off in later steps which applies a load on the substrate surface, such as rubbing, and flakes of the amorphous transparent conductive layer 6b" may possibly adhere to the pixel electrodes on the substrate. In this case, a short circuit occurs between the pixel electrodes to decrease a manufacturing yield of the active matrix substrate.

That is, in the formation of conductive elements by patterning a laminated conductive film including a first conductive metal film made of an aluminum film and a molybdenum film and a second conductive metal film made of an IZO film which is lower in etch rate than the first conductive metal film, the edge portions of the second conductive metal film (IZO layer) may possibly come off.

SUMMARY OF THE INVENTION

Under the above circumstances, the present invention has been achieved. An object of the present invention is to provide a method for manufacturing a conductive element substrate, wherein, in the manufacture of a conductive element by patterning a laminated conductive film including a first conductive metal film and a second conductive metal film which has a lower etch rate than the first conductive metal film and formed on the first conductive film, a decrease in manufacturing yield caused by coming off of the edge portions of the second conductive metal film.

To achieve the above object, the method of the present invention includes the step of etching only the second conductive metal film for forming the conductive element.

More specifically, the method for manufacturing the conductive element substrate according to the present invention comprises the steps of: (a) a laminated conductive film formation step of sequentially forming a first conductive metal film which is made of one or more metal layers and a second conductive metal film which is lower in etch rate than the first conductive metal film on a substrate to form a laminated conductive film; and (b) a conductive element formation step of patterning the laminated conductive film into a conductive element, wherein, in the step (b), the laminated conductive film is etched at least twice using different etchants such that the second conductive metal film becomes narrower than the first conductive metal film when viewed in cross section, thereby making the cross section of the laminated conductive film substantially tapered upward from the closest conductive metal film to the substrate.

The step (b) may include a first etching step of etching the first conductive metal film and the second conductive metal film simultaneously and a second etching step of etching the second conductive metal film only.

The second etching step may be carried out after the first etching step.

The first etching step may be carried out after the second etching step.

The second conductive metal film may be an amorphous transparent conductive film.

The amorphous transparent conductive film may be made of a compound of indium oxide and zinc oxide and etched with an aqueous oxalic acid solution in the second etching step.

The first etching step may include showering an etchant onto the laminated conductive film in the thickness direction of the laminated conductive film to allow the etchant to adhere to the laminated conductive film.

The second etching step may be carried out by at least one of the treatments of: dipping the substrate provided with the first conductive metal film and the second conductive metal film into an etchant; and showering the etchant onto the substrate.

The conductive element substrate according to the present invention comprises: a conductive element including a first conductive metal layer which is made of one or more metal layers formed on a substrate and a second conductive metal layer which is formed on the first conductive metal layer and lower in etch rate than the first conductive metal layer, wherein the first conductive metal layer and the second conductive metal layer are so configured that the second conductive metal layer becomes narrower than the first conductive metal layer when viewed in cross section, thereby making the cross section of the conductive element substantially tapered upward from the closest conductive metal layer to the substrate.

The present invention further provides a method for manufacturing a liquid crystal display including a pair of substrates opposed to each other and a liquid crystal layer sandwiched between the substrates. The method comprises: (a) a laminated conductive film formation step of sequentially forming a first conductive metal film which is made of one or more metal layers and a second conductive metal film which is lower in etch rate than the first conductive metal film on at least one of the substrates to form a laminated conductive film; and (b) a conductive element formation step of patterning the laminated conductive film into a conductive element, wherein, in the step (b), the laminated conductive film is etched at least twice using different etchants such that the second conductive metal film becomes narrower than the first conductive metal film when viewed in cross section, thereby making the cross section of the laminated conductive film substantially tapered upward from the closest conductive metal film to the substrate.

The step (b) may include a first etching step of etching the first conductive metal film and the second conductive metal film simultaneously and a second etching step of etching the second conductive metal film only.

The second etching step may be carried out after the first etching step.

The first etching step may be carried out after the second etching step.

The second conductive metal film may be an amorphous transparent conductive film.

The amorphous transparent conductive film may be made of a compound of indium oxide and zinc oxide and etched with an aqueous oxalic acid solution in the second etching step.

The conductive element may be a reflecting electrode.

The first etching step may include showering an etchant onto the laminated conductive film in the thickness direction of the laminated conductive film to allow the etchant to adhere to the laminated conductive film.

The second etching step may be carried out by at least one of the treatments of: dipping the substrate provided with the first conductive metal film and the second conductive metal film into an etchant; and showering the etchant onto the substrate.

The step (a) may include a transparent electrode formation step of forming a transparent electrode on the substrate, and the first conductive metal film and the second conductive metal film are formed in this order to cover the transparent electrode to form the laminated conductive film.

The method may further comprise a photolithography step of patterning a resist film of a desired configuration on the second conductive metal film between the step (a) and the step (b), wherein the patterned resist film is used as a mask to perform the etching in the step (b).

A mixed solution of nitric acid, phosphoric acid, acetic acid and water may be used in the first etching step.

The first conductive metal film may include a lower molybdenum film and an upper aluminum film.

The inventive liquid crystal display comprises a pair of substrates opposed to each other and a liquid crystal layer sandwiched between the substrates, the liquid crystal display further comprising: a conductive element including a first conductive metal layer which is made of one or more metal layers formed on at least one of the substrates and a second conductive metal layer which is formed on the first conductive metal layer and lower in etch rate than the first conductive metal layer, wherein the first conductive metal layer and the second conductive metal layer are so configured that the second conductive metal layer becomes narrower than the first conductive metal layer when viewed in cross section, thereby making the cross section of the conductive element substantially tapered upward from the closest conductive metal layer to the substrate.

The second conductive metal layer may be made of a compound of indium oxide and zinc oxide.

The first conductive metal layer may include a lower molybdenum layer and an upper aluminum layer.

A transparent electrode made of a compound of indium oxide and tin oxide may be formed on one of the surfaces of the first conductive metal layer closer to the substrate.

The present invention further provides electronic information equipment which employs the liquid crystal display of the present invention as a display screen. Thus, the above-described object of the present invention is achieved.

Hereinbelow, effects of the present invention will be described.

According to the method for manufacturing the conductive element substrate of the present invention, etching is carried out at least twice using different etchants. Therefore, the etching step includes a first etching step and a second etching step, for example. In the first etching step, the first and second conductive metal films for forming the laminated conductive film are etched simultaneously, whereas in the second etching step, only the second conductive metal film for forming the laminated conductive film is etched.

Since the second conductive metal film is lower in etch rate than the first conductive metal film, i.e., the second conductive metal film is harder to etch than the first conductive metal film, the edge portions of the second conductive metal film may possibly remain protruding more outward than the edge portions of the first conductive metal film after the first etching step. However, according to the present invention, the protruding edge portions of the second conductive metal film are etched away in the second etching step. As a result, the difference in etch rate between the first and second conductive metal films is resolved.

More specifically, in the first etching step, the edge portions of the second conductive metal film may possibly remain protruding more outward than those of the first conductive metal film due to the difference in etch rate between these films. However, in the second etching step, the protruding edge portions are etched away. Therefore, eventually, the edge portions of the second conductive metal film do not remain protruding, whereby the edge portions of the second conductive metal film are less likely to come off in later steps. This allows prevention of a decrease in manufacturing yield due to coming off of the edge portions of the second conductive metal film in the manufacture of the conductive element substrate.

If the second etching step is carried out after the first etching step, the first and second conductive metal films formed in sequence on the substrate to form a laminated conductive film in the laminated conductive film formation step are etched simultaneously in the first etching step to form a conductive element. At this time, since the second conductive metal film is harder to etch than the first conductive metal film, the edge portions of the second conductive metal film remain protruding more outward than the edge portions of the underlying first conductive metal film. Then, in the second etching step, the protruding edge portions of the second conductive metal film are etched away.

As a result, the conductive element has a substantially tapered cross section such that the thickness thereof decreases in the descending direction toward the peripheral edge thereof, i.e., the conductive element is substantially tapered upward from the closest layer to the substrate when viewed in cross section. Therefore, in later steps, the edge portions of the second conductive metal film for forming the conductive element are less likely to come off. This allows prevention of a decrease in manufacturing yield due to coming off of the edge portions of the second conductive metal film in the manufacture of the conductive element substrate.

On the other hand, if the first etching step is carried out after the second etching step, with respect to the first and second conductive metal films formed in sequence on the substrate to form a laminated conductive film in the laminated conductive film formation step, only the second conductive metal film for forming the laminated conductive film is etched first in the second etching step to form a conductive element. Then, in the first etching step, the first and second conductive metal films for forming the laminated conductive film are etched simultaneously. In the first etching step, the first conductive metal film exposed through the second etching step is etched and simultaneously, the edge portions of the second conductive metal film which has been etched in the second etching step are further etched.

As a result, the conductive element has a substantially tapered cross section such that the thickness thereof decreases in the descending direction toward the peripheral edge thereof, i.e., the conductive element is substantially tapered upward from the closest layer to the substrate when viewed in cross section. Therefore, in later steps, the edge portions of the second conductive metal film forming the conductive element are less likely to come off. This allows prevention of a decrease in manufacturing yield due to coming off of the edge portions of the second conductive metal film in the manufacture of the conductive element substrate.

If the second conductive metal film is an amorphous transparent conductive film made of a compound of indium oxide and zinc oxide (IZO), the effect of the present invention is exerted more significantly. That is, in the second etching step, only the IZO film in the laminated conductive film is etched by an aqueous oxalic acid solution.

More specifically, If the second etching step is carried out after the first etching step, a weakly acid etchant is used in the first etching step to etch the first conductive metal film and the IZO film (second conductive metal film) for forming the laminated conductive film simultaneously to form a conductive element. Since the IZO film is harder to etch with the weakly acid etchant than the first conductive metal film, the edge portions of the IZO film remain protruding more outward than the edges of the underlying first conductive metal film. Then, in the second etching step, the protruding edge portions of the IZO film are etched away.

As a result, the conductive element has a substantially tapered cross section such that the thickness thereof decreases in the descending direction toward the peripheral edge thereof, i.e., the conductive element is substantially tapered upward from the closest layer to the substrate when viewed in cross section. Therefore, in later steps, the edge portions of the IZO film for forming the conductive element are less likely to come off.

On the other hand, if the first etching step is carried out after the second etching step, only the IZO film (second conductive metal film) for forming the laminated conductive film is etched in the second etching step to form a conductive element. Then, in the first etching step, the first conductive metal film and the IZO film for forming the laminated conductive film are etched simultaneously using the above-described weakly acid etchant. In the first etching step, the first conductive metal film exposed through the second etching step is etched and the edge portions of the IZO film which has been etched in the second etching step are further etched.

As a result, the conductive element has a substantially tapered cross section such that the thickness thereof decreases in the descending direction toward the peripheral edge thereof, i.e., the conductive element is substantially tapered upward from the closest layer to the substrate when viewed in cross section. Therefore, in later steps, the edge portions of the IZO film for forming the conductive element are less likely to come off.

If dipping and showering are combined as appropriate in the second etching step, the second conductive metal film (amorphous transparent conductive film) is etched more efficiently in the manufacture of the conductive element substrate.

If showering is carried out in the first etching step, the first conductive metal film is etched more efficiently in the manufacture of the conductive element substrate.

In the conductive element substrate of the present invention, the conductive element is substantially tapered upward from the closest layer to the substrate when viewed in cross section. Therefore, even if any manufacturing process is carried out thereafter, the resulting second conductive metal layer will maintain high film strength, thereby preventing the second conductive metal layer from coming off.

According to the inventive method for manufacturing a liquid crystal display, etching is carried out at least twice using different etchants. Therefore, the etching step includes a first etching step and a second etching step, for example. In the first etching step, the first and second conductive metal films for forming the laminated conductive film are etched simultaneously, whereas in the second etching step, only the second conductive metal film for forming the laminated conductive film is etched.

Since the second conductive metal film is lower in etch rate than the first conductive metal film, i.e., the second conductive metal film is harder to etch than the first conductive metal film, the edge portions of the second conductive metal film may possibly remain protruding more outward than the edge portions of the first conductive metal film after the first etching step. However, according to the present invention, the protruding edge portions of the second conductive metal film are etched away in the second etching step. As a result, the difference in etch rate between the first and second conductive metal films is resolved.

More specifically, in the first etching step, the edge portions of the second conductive metal film may possibly remain protruding more outward than those of the first conductive metal film due to the difference in etch rate between these films. However, in the second etching step, the protruding edge portions are etched away. Therefore, eventually, the edge portions of the second conductive metal film do not remain protruding, whereby the edge portions of the second conductive metal film are less likely to come off in later steps. This allows prevention of a decrease in manufacturing yield due to coming off of the edge portions of the second conductive metal film in the manufacture of a liquid crystal display including conductive elements.

If the second etching step is carried out after the first etching step, the first and second conductive metal films formed in sequence on the substrate to form a laminated conductive film in the laminated conductive film formation step are etched simultaneously in the first etching step to form a conductive element, i.e., a reflecting electrode. At this time, since the second conductive metal film is harder to etch than the first conductive metal film, the edge portions of the second conductive metal film remain protruding more outward than the edge portions of the underlying first conductive metal film. Then, in the second etching step, the protruding edge portions of the second conductive metal film are etched away.

As a result, the conductive element has a substantially tapered cross section such that the thickness thereof decreases in the descending direction toward the peripheral edge thereof, i.e., the conductive element is substantially tapered upward from the closest layer to the substrate when viewed in cross section. Therefore, in later steps, the edge portions of the second conductive metal film for forming the reflecting electrode are less likely to come off. This allows prevention of a decrease in manufacturing yield due to coming off of the edge portions of the second conductive metal film in the manufacture of the liquid crystal display.

In such a case, the edge portions of the second conductive metal film remain protruding more outward than the edge portions of the first conductive metal film in the first etching step, and therefore the bottom of the protruding edge portions is exposed. This allows the etchant used in the second etching step to contact the sides and bottom of the second conductive metal film. Therefore, when the second etching step is carried out after the first etching step, the second conductive metal film is etched in a shorter time than when the first etching step is carried out after the second etching step and the etchant contacts mainly the sides of the second conductive metal film.

On the other hand, if the first etching step is carried out after the second etching step, with respect to the first and second conductive metal films formed in sequence on the substrate to form a laminated conductive film in the laminated conductive film formation step, only the second conductive metal film for forming the laminated conductive film is etched first in the second etching step to form a conductive element, i.e., a reflecting electrode. Then, in the first etching step, the first and second conductive metal films for forming the laminated conductive film are etched simultaneously. In the first etching step, the first conductive metal film exposed through the second etching step is etched and simultaneously, the edge portions of the second conductive metal film which has been etched in the second etching step are further etched.

As a result, the conductive element has a substantially tapered cross section such that the thickness thereof decreases in the descending direction toward the peripheral edge thereof, i.e., the conductive element is substantially tapered upward from the closest layer to the substrate when viewed in cross section. Therefore, in later steps, the edge portions of the second conductive metal film forming the reflecting electrode are less likely to come off. This allows prevention of a decrease in manufacturing yield due to coming off of the edge portions of the second conductive metal film in the manufacture of the liquid crystal display.

Further, if the transparent electrode and the laminated conductive film are formed in this order on the substrate, the transparent electrode will not contact the etchant for etching the second conductive metal film during the second etching step because the transparent electrode is covered with the first conductive metal film. Accordingly, through the whole etching step, the number of times that the transparent electrode contacts the etchant is reduced. Thus, when the first etching step follows the second etching step, the transparent electrode is prevented from coming off more effectively than when the second etching step is carried out after the first etching step and therefore the etchant contacts the transparent electrode in both etching steps.

If the second conductive metal film is an amorphous transparent conductive film made of a compound of indium oxide and zinc oxide (IZO) and the first conductive metal film is made of a lower molybdenum film and an upper aluminum film, the effect of the present invention is exerted more significantly. That is, in the first etching step, the molybdenum film, aluminum film and IZO film are etched with a weakly acid etchant such as a mixed solution of nitric acid, phosphoric acid, acetic acid and water. In the second etching step, only the IZO film in the laminated conductive film is etched with an aqueous oxalic acid solution.

More specifically, if the second etching step is carried out after the first etching step, the molybdenum film, aluminum film and IZO film for forming the laminated conductive film are etched simultaneously with a weakly acid etchant such as a mixed solution of nitric acid, phosphoric acid, acetic acid and water to form the reflecting electrode in the first etching step. Since the IZO film is harder to etch with the weakly acid etchant than the molybdenum film and the aluminum film, the edge portions of the IZO film remain protruding more outward than the edge portions of the underlying film. Then, in the second etching step, the protruding edge portions of the IZO film are etched away.

As a result, the conductive element has a substantially tapered cross section such that the thickness thereof decreases in the descending direction toward the peripheral edge thereof, i.e., the conductive element is substantially tapered upward from the closest layer to the substrate when viewed in cross section. Therefore, in later steps, the edge portions of the IZO film forming the reflecting electrode are less likely to come off.

On the other hand, if the first etching step is carried out after the second etching step, only the IZO film is etched with an aqueous oxalic acid solution to form the reflecting electrode in the second etching step. Then, in the first etching step, the molybdenum film, aluminum film and IZO film are etched simultaneously using the weakly acid etchant. In the first etching step, the aluminum film and the molybdenum film exposed through the second etching step are etched and simultaneously, the edge portions of the IZO film which has been etched in the second etching step are further etched.

As a result, the conductive element has a substantially tapered cross section such that the thickness thereof decreases in the descending direction toward the peripheral edge thereof, i.e., the conductive element is substantially tapered upward from the closest layer to the substrate when viewed in cross section. Therefore, in later steps, the edge portions of the IZO film for forming the reflecting electrode are less likely to come off.

If dipping and showering are combined as appropriate in the second etching step, the second conductive metal film (amorphous transparent conductive film) is etched more efficiently in the manufacture of the conductive element substrate.

If showering is carried out in the first etching step, the first conductive metal film is etched more efficiently in the manufacture of the conductive element substrate.

If the laminated conductive film formation step includes a transparent electrode formation step for forming a transparent electrode on the substrate and the first and second conductive films are formed in this order to cover the transparent electrode to form the laminated conductive film, the transparent electrode and the reflecting electrode which is formed on the transparent electrode and constituted of the first and second conductive metal films are provided in each pixel. This prevents a decrease in manufacturing yield due to coming off of the edge portions of the amorphous transparent conductive film in the manufacture of a semi-transmissive liquid crystal display provided with the transparent electrode and the reflecting electrode in each pixel.

According to the liquid crystal display of the present invention, the conductive element is so configured that the cross section thereof is substantially tapered upward from the closest layer to the substrate. Therefore, even if the conductive element is further subjected to any other manufacturing processes such as rubbing, the second conductive metal film maintains high film strength, thereby preventing the second conductive metal film from coming off.

As described above, according to the present invention, a plurality of metal layers which are different in etch rate are patterned using a plurality of etchants having selectivity, thereby forming a conductive element whose cross section is substantially tapered upward from the closest metal layer to the substrate.

For example, if the second conductive metal layer is an IZO layer and the first conductive metal layer is made of an upper aluminum layer and a lower molybdenum layer, a first etchant capable of etching all these layers is used to etch them. Then, a conductive element whose cross section is substantially tapered downward from the farthest layer from the substrate is obtained as shown in FIG. 46. Even in such a case, etching is carried out using a second etchant capable of selectively etching the IZO layer 104 only. Thus, as shown in FIG. 22, the uppermost IZO layer 104 is more narrowed in the horizontal direction than the aluminum layer 103 and the molybdenum layer 102, thereby obtaining the conductive element whose cross section is substantially tapered upward from the closest layer to the substrate.

Prior to the first etching step, a resist film may be patterned into a desired configuration by photolithography on the uppermost IZO film so that the patterned resist film is used as a mask for the first and second etching steps. Thus, the first and second etching steps are carried out continuously using the resist film formed by a single photolithography process. This prevents a significant increase in manufacturing step.

As the first etchant capable of etching the IZO layer, aluminum layer and molybdenum layer, a mixed solution of nitric acid, phosphoric acid, acetic acid and water may be used, for example. As the second etchant capable of selectively etching the IZO layer only, an aqueous oxalic acid solution may be used, for example.

If the conductive element constituted of a plurality of layers is formed to have the upward-tapered cross section as shown in FIG. 22, high film strength is given to the lower layer even if the thus obtained conductive element is a finally obtained one or further subjected to any other manufacturing steps. Thus, the lower layer is prevented from coming off.

According to the method for manufacturing the conductive element substrate of the present invention, a conductive element is formed by patterning the laminated conductive film which is constituted of the first conductive metal film and the second conductive metal film which is formed on the first conductive metal film and is lower in etch rate than the first conductive metal film. The method includes the second etching step for etching the second conductive metal film only. Therefore, in the first etching step in which the first and second conductive metal films are etched simultaneously, the edge portions of the second conductive metal film may remain protruding more outward than the edge portions of the underlying film due to the difference in etch rate between the first and second conductive metal films for forming the laminated conductive film. However, the protruding edge portions of the second conductive metal film are etched away in the second etching step. Therefore, eventually, the edge portions of the second conductive metal film will not remain protruding. Thus, in the manufacture of the conductive element by patterning the first conductive metal film and the second conductive metal film which is lower in etch rate than the first conductive metal film in the course of manufacture of the conductive element substrate, a decrease in manufacturing yield due to coming off of the edge portions of the second conductive metal film is prevented.

DETAILED DESCRIPTION OF THE INVENTION

Hereinafter, embodiments of the present invention will be described with reference to the drawings. In the following embodiments, an active matrix substrate for forming a liquid crystal display is taken as an example of a conductive element substrate. A reflecting electrode described in the following embodiments corresponds to a conductive element on the conductive element substrate. In the following embodiments, the term "film" signifies a film which is just formed and not yet etched or patterned and the term "layer" signifies a film which has been etched or patterned.

Embodiment 1

Hereinafter, a liquid crystal display of Embodiment 1 of the present invention will be described.

Figure 1:
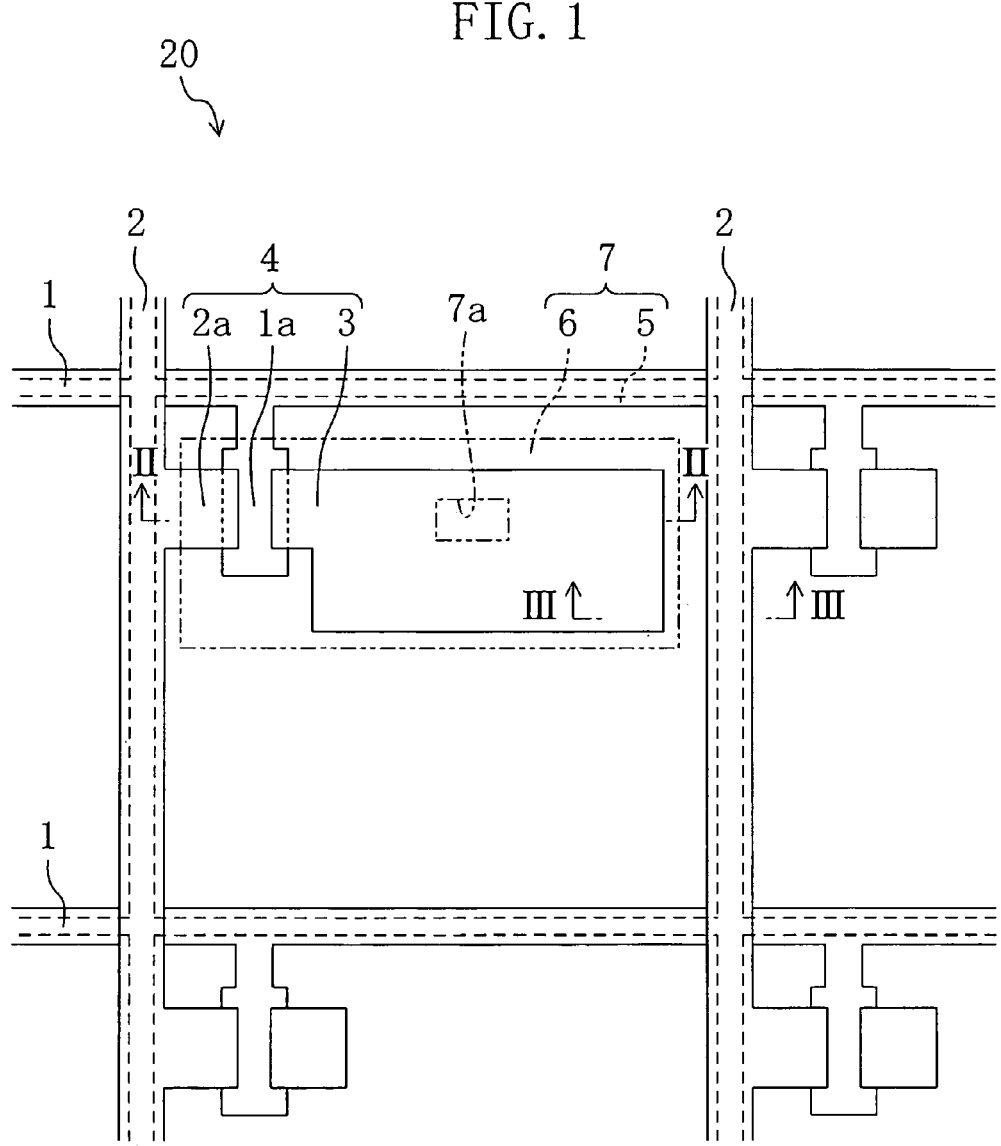
FIG. 1 is a schematic plan view illustrating an active matrix substrate 20 for forming a liquid crystal display 50 according to Embodiments 1 and 2 of the present invention.
Figure 2:
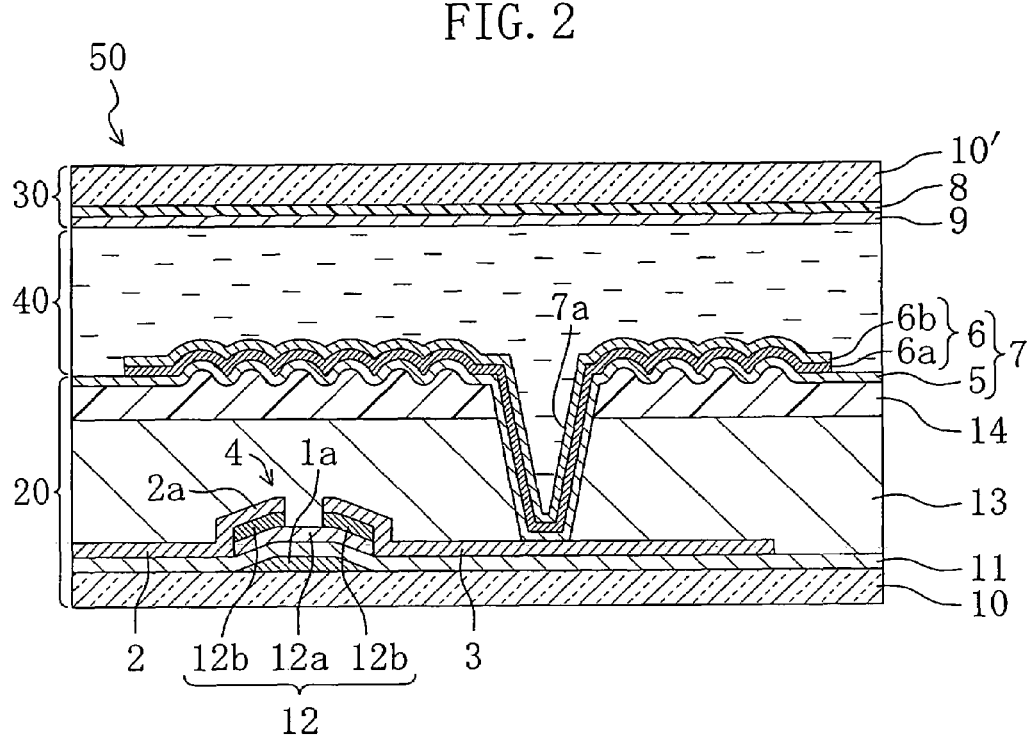
FIG. 2 is a schematic sectional view illustrating the liquid crystal display 50 cut along the line II-II shown in FIG. 1.
Figure 3:
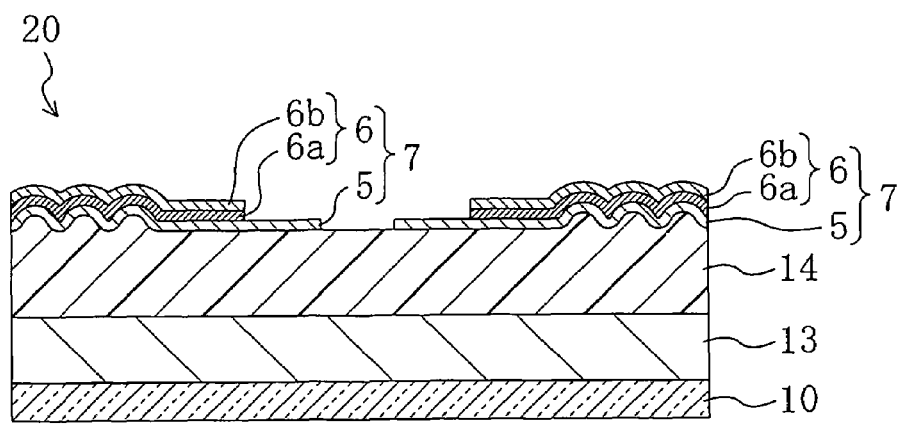
FIG. 3 is a schematic sectional view illustrating the active matrix substrate 20 cut along the line III-III shown in FIG. 1.

FIG. 1 is a schematic plan view of an active matrix substrate 20 for forming a liquid crystal display 50 according to Embodiment 1 of the present invention. FIG. 2 is a schematic sectional view of the liquid crystal display 50 cut along the line II-II shown in FIG. 1. FIG. 3 is a schematic sectional view of the active matrix substrate 20 cut along the line III-III shown in FIG. 1, illustrating a section of the edge portions of two adjacent pixels.

The liquid crystal display 50 includes the active matrix substrate 20, a counter substrate 30 opposed to the active matrix substrate 20 and a liquid crystal layer 40 sandwiched between the substrates 20 and 30.

As to the active matrix substrate 20, a plurality of gate lines 1 extending parallel to each other and a plurality of source lines 2 extending parallel to each other are arranged on a glass substrate 10 and the gate lines 1 and the source lines 2 are orthogonal to each other. TFTs 4 are formed near the intersections of the gate lines 1 and the source lines 2. In display regions surrounded by two adjacent gate lines 1 and two adjacent source lines 2, pixel electrodes 7 are formed correspondingly to the TFTs 4.

Each of the pixel electrodes 7 includes a transparent electrode 5 formed over the whole area of each display region and a reflecting electrode 6 covering the TFT 4.

The active matrix substrate 20 is of a multilayer structure of a glass substrate 10, a gate insulating film 11 and an interlayer insulating film 13 stacked in this order.

Between the glass substrate 10 and the gate insulating film 11, the gate lines 1 and gate electrodes 1a protruding from the gate lines 1 in the direction parallel to the source lines 2 are arranged.

Between the gate insulating film 11 and the interlayer insulating film 13, a semiconductor layer 12 for forming the TFTs 4 is provided.

The semiconductor layer 12 is made of a lower intrinsic amorphous silicon layer 12a and an upper $n^+$ amorphous silicon layer 12b.

On the semiconductor layer 12, the source lines 2, source electrodes 2a protruding from the source lines 2 in the direction parallel to the gate lines 1 and drain electrodes 3 opposed to the source electrodes 2a are formed.

On the interlayer insulating film 13, a rough-surface insulating film 14 is formed. Parts of the surface of the insulating film 14 corresponding to the positions of the reflecting electrodes 6 are provided with irregularities.

On the rough-surface insulating film 14, the pixel electrodes 7 are formed and connected to the drain electrodes 3 via contact holes 7a, respectively.

Each of the pixel electrodes 7 includes a transparent electrode 5 and a reflecting electrode 6. The reflecting electrode 6 is made of a lower conductive metal layer (first conductive metal layer) 6a and an upper amorphous transparent conductive layer (second conductive metal layer) 6b. In part of the pixel electrode 7 corresponding to the reflecting electrode 6, irregularities are formed correspondingly to the irregularities on the underlying rough-surface insulating film 14. Owing to the irregularities, light incident on the reflecting electrode 6 is scattered and the direction of light reflection is aligned with the normal direction to the substrate surface. This increases the amount of light traveling in the normal direction, actually improving the reflectance of the reflecting electrode 6.

The counter substrate 30 is of a multilayer structure of a color filter layer 8, an overcoat layer (not shown) and common electrodes 9 formed in this order on a glass substrate 10'.

The color filter layer 8 includes color layers of red, green and blue corresponding to the pixels, respectively, and a black matrix arranged between each color layer.

The liquid crystal layer 40 is constituted of liquid crystal molecules made of a nematic liquid crystal material having an electrooptic characteristic.

In the liquid crystal display 50, each of the pixel electrodes 7 constitutes a single pixel. In each pixel, when a gate signal is sent through the gate line 1 to turn the TFT 4 on, a source signal is sent through the source line 2 to write certain charge in the pixel electrode 7 via the source electrode 2a and the drain electrode 3. Then, a potential difference occurs between the pixel electrode 7 and the common electrode 9, thereby applying a certain voltage to a liquid crystal capacitor constituted of the liquid crystal layer 40. In the liquid crystal display 50, transmittance of light incident from outside is adjusted by making use of the variation in orientation of the liquid crystal molecules depending on the applied voltage, thereby achieving visual display. Since the liquid crystal display 50 is a semi-transmissive liquid crystal display, light from a backlight is passed through the transparent electrode 5 to achieve visual display in the transmissive mode, while ambient light is reflected on the reflecting electrode 6 to achieve visual display in the reflective mode.

Subsequently, explanation is given of a method for manufacturing the liquid crystal display 50 according to Embodiment 1 of the present invention.

[Step of Manufacturing Active Matrix Substrate]

Hereinafter, explanation is given of the step of manufacturing the active matrix substrate 20 according to Embodiment 1 of the present invention with reference to the drawings. The step includes a TFT formation step, a laminated conductive film formation step and a reflecting electrode formation step. FIGS. 4 to 10 are schematic sectional views corresponding to the section cut along the line III-III of FIG. 1, illustrating the steps of forming the reflecting electrode 6 in the manufacture of the active matrix substrate 1 of Embodiment 1.

[Step of Manufacturing TFT (Including the Formation of a Rough-Surface Insulating Film 14)]

The step of manufacturing a TFT will be described below.

First, a tantalum (Ta) film of about 3000 Å in thickness is formed by sputtering on the entire surface of the glass substrate 10 and then patterned into a gate line 1 and a gate electrode 1a by photolithography (Photo Engraving Process, hereinafter abbreviated as PEP).

Then, a silicon nitride (SiNx) film of about 3000 Å in thickness is formed by CVD (chemical vapor deposition) over the entire surface of the substrate provided with the gate line 1 and the gate electrode 1a to provide a gate insulating film 11.

Then, an intrinsic amorphous silicon (Si) film of about 1500 Å in thickness and an $n^+$ amorphous silicon ($n^+$ Si) film of about 500 Å in thickness are formed in this order over the gate insulating film 11. The intrinsic amorphous silicon film and the $n^+$ amorphous silicon film, which serve as a semiconductor film, are patterned by PEP such that the semiconductor film remains in island configuration on the gate electrode 1a.

Next, an ITO film of about 4500 Å in thickness and a tantalum (Ta) film of about 4500 Å in thickness are formed in this order by sputtering over the entire surface of the substrate provided with the semiconductor layer patterned in the island configuration and the gate insulating film 11, and then patterned by PEP. Thus, a source line 2, a source electrode 2a and a drain electrode 3 which are made of an ITO layer and a Ta layer are obtained.

The thus obtained source line 2 has a two-layered structure of the ITO layer and the Ta layer. Therefore, even if a break occurs in one of the layers, the other layer keeps electric connection. This reduces the occurrence of a break in the source line 2.

Then, using the source electrode 2a and the drain electrode 3 as a mask, the $n^+$ amorphous silicon film in the semiconductor layer patterned in the island configuration is etched to form a channel therein, thereby providing an $n^+$ amorphous silicon layer 12b. Thus, a TFT 4 including the gate electrode 1a, the gate insulating film 11, the semiconductor layer 12 made of the intrinsic amorphous silicon layer 12a and the $n^+$ amorphous silicon layer 12b, the source electrode 2a and the drain electrode 3 is formed.

Next, a silicon nitride (SiNx) film of about 3000 Å in thickness is formed by CVD over the entire surface of the substrate provided with the source line 2, source electrode 2a and drain electrode 3. Part of the SiNx film corresponding to the drain electrode 3 is then etched away to obtain an interlayer insulating film 13.

Then, a photosensitive acryl resin film of about 3 μm in thickness is formed over the entire surface of the substrate provided with the interlayer insulating film 13 by spin coating.

The photosensitive acryl resin film is then subjected to the following two-step light exposure.

The photosensitive acryl resin film used herein will be readily-soluble when exposed to light.

First, light exposure is carried out using h ray (ultraviolet ray of 405 nm wavelength) at a light energy of 40 mJ so that the photosensitive acryl resin film is half-exposed to light. Thus, a recess is formed in the surface of the photosensitive acryl resin film.

Then, full light exposure is carried out using the h ray at a light energy of 240 mJ with respect to part of the photosensitive acryl resin film corresponding to the drain electrode 3. Further, development and thermosetting are carried out to form a rough-surface insulating film 14 having a rough surface and a contact hole 7a.

Then, ashing is carried out to improve adhesion between the rough-surface insulating film 14 and an ITO film to be formed thereon and to remove residues of the rough-surface insulating film 14 remaining in the contact hole 7a.

[Laminated Conductive Film Formation Step]

Next, explanation is given of a laminated conductive film formation step. The laminated conductive film formation step includes a transparent electrode formation step and a conductive metal film/amorphous transparent conductive film formation step.

[Transparent Electrode Formation Step]

An ITO film of about 1500 Å in thickness is formed by sputtering over the entire surface of the substrate provided with the rough-surface insulating film 14, and then patterned into a transparent electrode 5 by PEP.

[Conductive Metal Film/Amorphous Transparent Conductive Film Formation Step]

Figure 4:
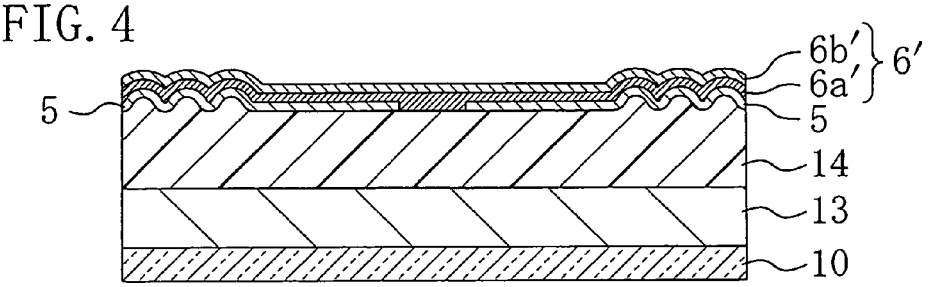
FIG. 4 is a schematic sectional view corresponding to the section cut along the line III-III in FIG. 1, illustrating the step of forming a laminated conductive film for forming a reflecting electrode according to Embodiments 1 and 2 of the present invention.

As shown in FIG. 4, a conductive metal film (first conductive metal film) 6a' made of a molybdenum film of about 750 Å in thickness and an aluminum film of about 1000 Å in thickness and an amorphous transparent conductive film (second conductive metal film) 6b' made of an IZO film of 100 Å in thickness are formed in this order by sputtering over the entire surface of the substrate provided with the transparent electrode 5. Thus, a laminated conductive film is obtained.

The thickness of the IZO film is preferably in the range of 10 to 200 Å from the aspect of display quality of the resulting liquid crystal display. For example, if the IZO film has as large thickness as several thousand Å, light to be reflected is absorbed into the thick IZO film, resulting in a significant decrease in display quality. Further, since the color of the IZO film depends on its thickness, the IZO film will be colored if its thickness is more than 200 Å, resulting in a decrease in display quality. Therefore, the upper limit of the thickness of the IZO film is 200 Å. On the other hand, if the IZO film is too thin, a difference in work function will arise between the surfaces of the reflecting electrode 6 and the transparent electrode 5. Therefore, to equalize their work functions, the lower limit of the thickness of the IZO film is 10 Å. In reflective-mode display, the color of the reflecting electrode 6 in the pixel electrode 7 directly affects the display quality. Therefore, it is important to control the thickness of the IZO film.

[Reflecting Electrode Formation Step]

Hereinafter, explanation is a reflecting electrode formation step. The reflecting electrode formation step includes a resist application step, a light exposure step, a development step, a first etching step, a second etching step and a peeling step.

[Resist Application Step]

Figure 5:
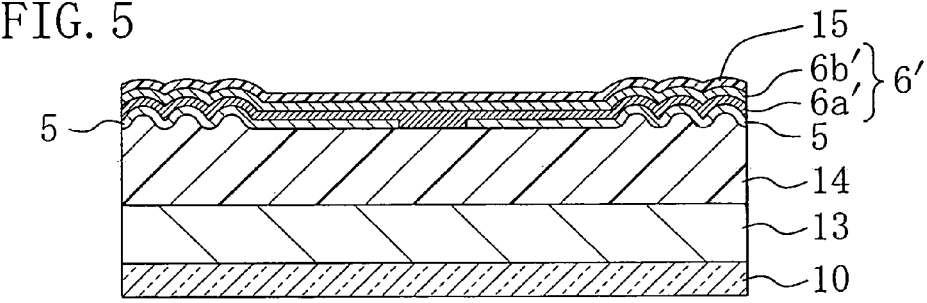
FIG. 5 is a schematic sectional view corresponding to the section cut along the line III-III in FIG. 1, illustrating the step of applying a resist film for forming the reflecting electrode according to Embodiments 1 and 2 of the present invention.

As shown in FIG. 5, a photoresist 15 of 2.0 to 2.4 μm in thickness is formed by applying a photosensitive resin to the entire surface of the substrate provided with the amorphous transparent conductive film (second conductive metal film) 6b'. The photoresist 15 is a positive resist containing a novolac resin.

[Light Exposure Step]

Figure 6:
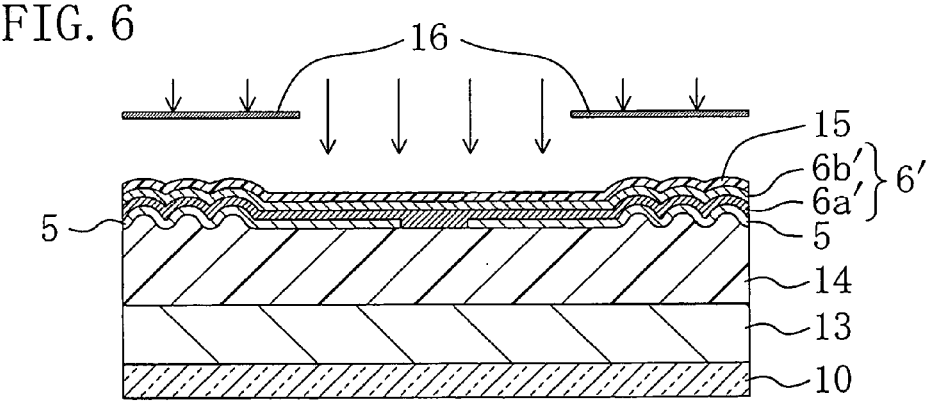
FIG. 6 is a schematic sectional view corresponding to the section cut along the line III-III in FIG. 1, illustrating the step of light exposure for forming the reflecting electrode according to Embodiments 1 and 2 of the present invention.

As shown in FIG. 6, the photoresist 15 applied to the entire surface of the substrate is exposed to light using a photomask 16. By so doing, the photoresist 15 uncovered with the photomask 16 becomes readily soluble.

[Development Step]

Figure 7:
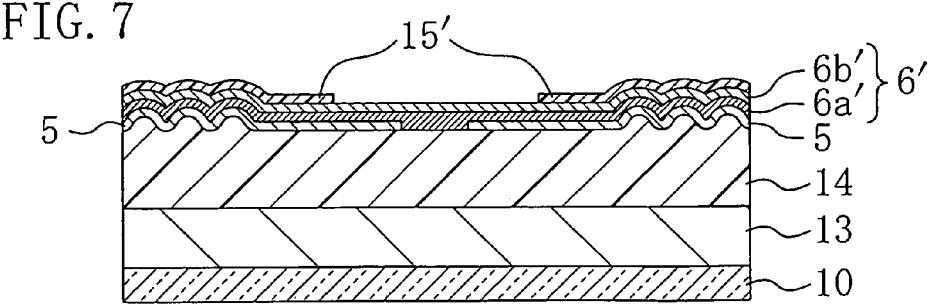
FIG. 7 is a schematic sectional view corresponding to the section cut along the line III-III in FIG. 1, illustrating the step of development for forming the reflecting electrode according to Embodiments 1 and 2 of the present invention.

As shown in FIG. 7, development is carried out using an aqueous alkali solution containing 2.38 wt % of TMAH (tetramethylammonium hydroxide) as a developer to form a resist pattern 15'.

If the photoresist 15 is a negative resist, part of the photoresist 15 to be left on the substrate is covered with the photomask 16.

[First Etching Step]

Figure 8:
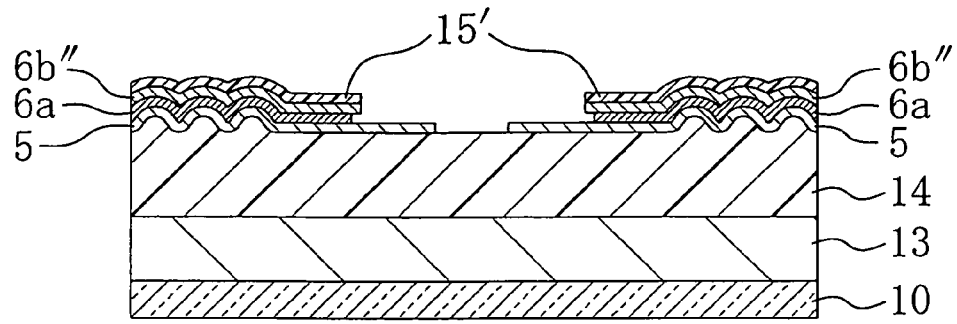
FIG. 8 is a schematic sectional view corresponding to the section cut along the line III-III in FIG. 1, illustrating a first etching step for forming the reflecting electrode according to Embodiment 1 of the present invention.

As shown in FIG. 8, a laminated conductive film 6' is etched with an aqueous solution containing nitric acid, acetic acid and phosphoric acid (weakly acid etchant) using the resist pattern 15' as a mask. Thus, a conductive metal layer (first conductive metal layer) 6a and an amorphous transparent conductive layer (second conductive metal layer) 6b" are obtained. At this time, the edge portions of the amorphous transparent conductive layer (second conductive metal layer) 6b" remain protruding more outward than the edge portions of the underlying conductive metal layer 6a.

[Second Etching Step]

Figure 9:
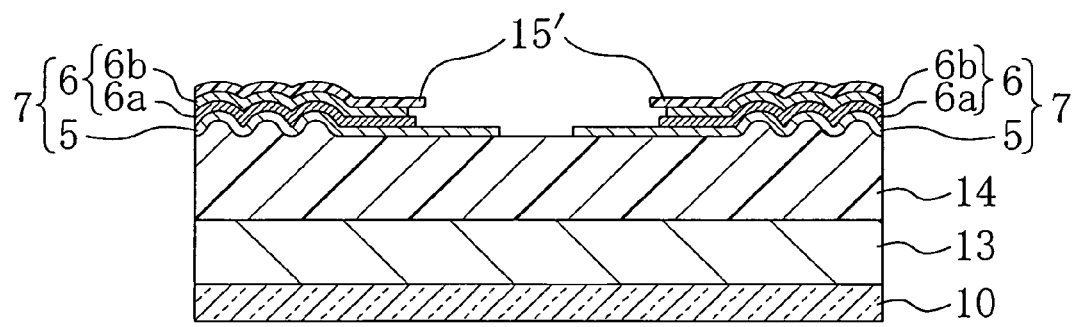
FIG. 9 is a schematic sectional view corresponding to the section cut along the line III-III in FIG. 1, illustrating a second etching step for forming the reflecting electrode according to Embodiment 1 of the present invention.

As shown in FIG. 9, the edge portions of the amorphous transparent conductive layer (second conductive metal layer) 6b" are etched with an aqueous oxalic acid solution using the resist pattern 15' as a mask. Thus, an amorphous transparent conductive layer (second conductive metal layer) 6b is obtained. In this way, the protruding edge portions of the amorphous transparent conductive layer (second conductive metal layer) 6b" after the first etching step are etched away, thereby obtaining a reflecting electrode 6 made of a conductive metal layer (first conductive metal layer) 6a and the amorphous transparent conductive layer (second conductive metal layer) 6b.

At this time, the edge portions of the reflecting electrode 6 are substantially tapered such that the thickness thereof decreases in descending direction toward the ends thereof. Accordingly, in later steps such as rubbing, the amorphous transparent conductive layer (second conductive metal layer) 6b for forming the reflecting electrode 6 is less likely to come off.

After the first etching step, the edge portions of the amorphous transparent conductive layer (second conductive metal layer) 6b" protrude more outward than the edge portions of the underlying layer. Therefore, the bottom of the amorphous transparent conductive layer (second conductive metal layer) 6b" is exposed at the protruding edge portions. Accordingly, the aqueous oxalic acid solution used in the second etching step comes into contact with the sides and bottom of the protruding edge portions of the amorphous transparent conductive layer (second conductive metal layer) 6b". As a result, etching of the amorphous transparent conductive film (second conductive metal film) 6b' proceeds more quickly than when the first etching step is carried out after the second etching step, i.e., when the aqueous oxalic acid solution comes into contact mainly with the sides of the amorphous transparent conductive film (second conductive metal film) 6b' (Embodiment 2 to be described later).

[Peeling Step]

Figure 10:
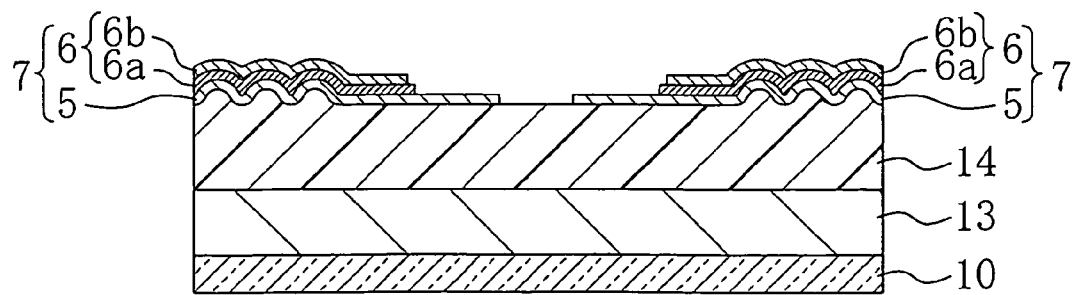
FIG. 10 is a schematic sectional view corresponding to the section cut along the line III-III in FIG. 1, illustrating a peeling step for forming the reflecting electrode according to Embodiment 1 of the present invention.

As shown in FIG. 10, the resist pattern 15' used for patterning the laminated conductive film 6' is peeled off using an amine-based peeling solution.

Thus, in the above-described manner, the active matrix substrate 20 is manufactured.

[Step of Manufacturing Counter Substrate]

Next, explanation is given of the step of manufacturing a counter substrate.

First, a thin chromium film is formed on a glass substrate 10' and patterned by PEP to form a black matrix.

Then, color layers of red, blue and green are formed in open areas in the black matrix, respectively, to form a color filter layer 8.

An acryl resin is applied to the entire surface of the substrate provided with the color filter layer 8 to form an overcoat layer.

An ITO film is then formed on the entire surface of the substrate provided with the overcoat layer to form common electrodes 9. Thus, a counter substrate 30 is manufactured.

[Step of Manufacturing Liquid Crystal Display]

Hereinafter, explanation is given of the step of manufacturing a liquid crystal display.

First, on the surfaces of the active matrix substrate 20 and the counter substrate 30, a polyimide resin is applied to form alignment films of about 1000 Å in thickness, followed by baking at 180 to 200° C.

Then, the surfaces of the baked alignment films are rubbed.

Then, to one of the substrates 20 and 30, a sealing material made of a thermosetting epoxy resin or the like is applied in the form of a frame having a liquid crystal injection hole. On the other substrate, spherical spacers which are made of a resin or silica and have a diameter corresponding to the thickness of a liquid crystal layer 40 are dispersed.

Then, the substrates 20 and 30 are bonded and the sealing material is cured to form an empty cell therebetween.

A liquid crystal material is then injected in the empty cell between the bonded substrates 20 and 30 by a dipping method to form a liquid crystal layer 40. Then, a UV curing resin is applied into the liquid crystal injection hole and then cured by UV irradiation, thereby sealing the injection hole.

Thus, the liquid crystal display 50 of the present invention is manufactured.

As described above, according to the method of manufacturing the liquid crystal display 50 of the present invention, the conductive metal film (first conductive metal film) 6a' and the amorphous transparent conductive film (second conductive metal film) 6b', which constitute the laminated conductive film, are simultaneously etched in the first etching step. As a result, the edge portions of the amorphous transparent conductive layer (second conductive metal layer) 6b" on the conductive metal layer (first conductive metal layer) 6a remain protruding more outward than the edge portions of the underlying conductive metal layer (first conductive metal layer) 6a. Then, in the following second etching step, the protruding edge portions of the amorphous transparent conductive layer (second conductive metal layer) 6b" are etched away. Therefore, eventually, the edge portions of the amorphous transparent conductive layer (second conductive metal layer) 6b will not remain protruding.

Accordingly, the edge portions of the amorphous transparent conductive layer (second conductive metal layer) 6b are less likely to come off in later steps. This prevents a decrease in manufacturing yield due to coming off of the edge portions of the amorphous transparent conductive layer (second conductive metal layer) 6b in the manufacture of the liquid crystal display 50.

Embodiment 2

A liquid crystal display according to Embodiment 2 of the present invention will be described below.

The liquid crystal display according to Embodiment 2 and an active matrix substrate for manufacturing the liquid crystal display are substantially the same in plane structure and sectional structure as those described in Embodiment 1 except the manufacturing method thereof. Therefore, in the following embodiment, explanation is given principally of a method of manufacturing the liquid crystal display, in particular, the step of manufacturing the active matrix substrate.

[Step of Manufacturing Active Matrix Substrate]

Figure 11:
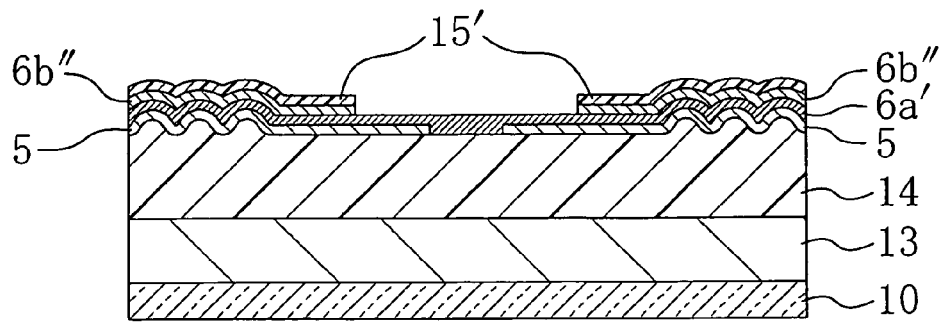
FIG. 11 is a schematic sectional view corresponding to the section cut along the line III-III in FIG. 1, illustrating a second etching step for forming the reflecting electrode according to Embodiment 2 of the present invention.
Figure 12:
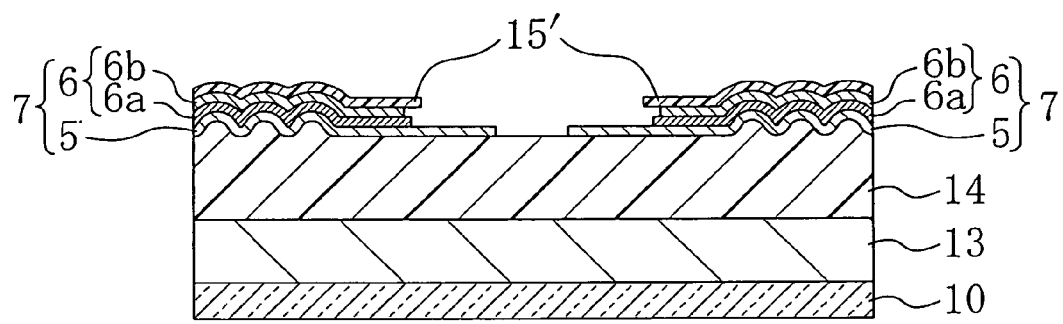
FIG. 12 is a schematic sectional view corresponding to the section cut along the line III-III in FIG. 1, illustrating a first etching step for forming the reflecting electrode according to Embodiment 2 of the present invention.
Figure 13:
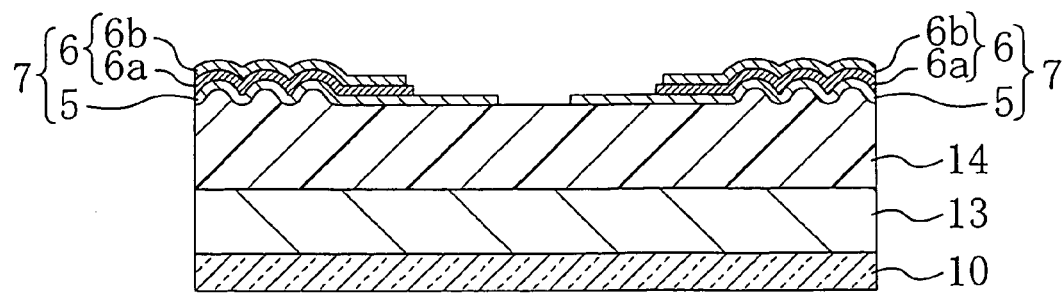
FIG. 13 is a schematic sectional view corresponding to the section cut along the line III-III in FIG. 1, illustrating a peeling step for forming the reflecting electrode according to Embodiment 2 of the present invention.

Hereinafter, explanation is given of the step of manufacturing an active matrix substrate according to Embodiment 2 of the present invention with reference to the drawings. The step includes a TFT formation step, a laminated conductive film formation step and a reflecting electrode formation step. FIGS. 11 to 13 are schematic sectional views corresponding to the section cut along the line III-III of FIG. 1, illustrating the steps of forming a reflecting electrode 6 in the step of the active matrix substrate of Embodiment 2.

[Step of Manufacturing TFT (Including the Formation of a Rough-Surface Insulating Film 14)]

In the same manner as Embodiment 1, a TFT 4, an interlayer insulating film 13 and a rough-surface insulating film 14 are formed on a glass substrate 10.

[Laminated Conductive Film Formation Step]

As shown in FIG. 4, in the same manner as the transparent electrode formation step and the conductive metal film/amorphous transparent conductive film formation step according to Embodiment 1, a laminated conductive film 6' made of a conductive metal film (first conductive metal film) 6a' and an amorphous transparent conductive film (second conductive metal film) 6b' is formed on a transparent electrode 5 on the glass substrate 10.

[Reflecting Electrode Formation Step]

In the same manner as Embodiment 1, a resist application step (FIG. 5), a light exposure step (FIG. 6) and a development step are carried out to form a resist pattern 15' on the laminated conductive film 6' on the glass substrate 10, as shown in FIG. 7.

[Second Etching Step]

Using the resist pattern 15' as a mask, the amorphous transparent conductive film (second conductive metal film) 6b' is etched with an aqueous oxalic acid solution. Thus, an amorphous transparent conductive layer (second conductive metal layer) 6b" is obtained as shown in FIG. 11.

[First Etching Step]

Using the resist pattern 15' as a mask, the conductive metal film (first conductive metal film) 6a' and the amorphous transparent conductive layer (second conductive metal layer) 6b" are etched with an aqueous solution containing nitric acid, acetic acid and phosphoric acid (weakly acid etchant). Thus, a conductive metal layer (first conductive metal layer) 6a and an amorphous transparent conductive layer (second conductive metal layer) 6b are obtained. In this way, a reflecting electrode 6 made of the conductive metal layer (first conductive metal layer) 6a and the amorphous transparent conductive layer (second conductive metal layer) 6b is obtained.

In the first etching step, the conductive metal film (first conductive metal film) 6a' exposed through the second etching step is etched. Simultaneously, the edge portions of the amorphous transparent conductive layer (second conductive metal layer) 6b" which has been etched in the second etching step are further etched.

As a result, the edge portions of the reflecting electrode 6 are substantially tapered such that the thickness thereof decreases in descending direction toward the ends thereof. Therefore, in later steps such as rubbing, the edge portions of the amorphous transparent conductive layer (second conductive metal layer) 6b for forming the reflecting electrode 6 are less likely to come off.

[Peeling Step]

As shown in FIG. 13, the resist pattern 15' used for patterning the laminated conductive film 6' is peeled off using an amine-based peeling solution.

In the above-described manner, the active matrix substrate 20 is manufactured.

Since the steps of manufacturing the counter substrate and the liquid crystal display are the same as those described in Embodiment 1, explanation thereof is omitted.

Thus, the liquid crystal display 50 of the present invention is manufactured.

As described above, in the manufacture of the reflecting electrode 6 by the method for manufacturing the liquid crystal display of the present invention, only the amorphous transparent conductive film (second conductive metal film) 6b' is etched in the second etching step. Then, in the first etching step, the conductive metal film (first conductive metal film) 6a' and the amorphous transparent conductive film, or the amorphous transparent conductive layer (second conductive metal layer) 6b", which constitute the laminated conductive film, are etched simultaneously. In the first etching step, the conductive metal film (first conductive metal film) 6a' exposed through the second etching step is etched and the edge portions of the amorphous transparent conductive layer (second conductive metal layer) 6b" which has been etched in the second etching step are further etched.

Accordingly, the edge portions of the reflecting electrode 6 are substantially tapered such that the thickness thereof decreases in descending direction toward the ends thereof. As a result, the edge portions of the amorphous transparent conductive layer (second conductive metal layer) 6b for forming the reflecting electrode 6 are less likely to come off in later steps. This prevents a decrease in manufacturing yield due to coming off of the edge portions of the amorphous transparent conductive layer (second conductive metal layer) 6b in the manufacture of the liquid crystal display.

In the second etching step, the transparent electrode 5 is covered with the conductive metal film (first conductive metal film) 6a'. Therefore, the aqueous oxalic acid solution will not come into contact with the transparent electrode 5. Accordingly, through the whole etching step, the number of times that the transparent electrode 5 contacts the etchant is reduced. Thus, the transparent electrode 5 is prevented from coming off more effectively than the case when the second etching step is carried out after the first etching step as described in Embodiment 1 and the etchants (a weakly acid etchant and an aqueous oxalic acid solution) contact the transparent electrode 5 in both the first and second etching steps.

As compared with the method of Embodiment 1, the method of Embodiment 2 which prevents the transparent electrode 5 from coming off requires longer etching time in the second etching step. However, the effect of Embodiment 2 is advantageously exerted in a photo rework process described later.

Details of the photo rework process will be described below.

The step of forming the transparent electrode 5 and the reflecting electrode 6, in particular, the step of forming the reflecting electrode 6, is the final step in the manufacture of the active matrix substrate 20 for forming the semi-transmissive liquid crystal display 50. Therefore, from the viewpoint of improvement in manufacturing yield, it is effective to check whether or not the resist pattern 15' is patterned in a desired configuration before the patterning of the laminated conductive film 6'.

If the configuration of the resist pattern 15' is found proper, the laminated conductive film 6' is etched using the proper resist pattern 15' as a mask to form the reflecting electrode 6.

On the other hand, if the configuration of the resist pattern 15' is found improper, the improper resist pattern 15' and the laminated conductive film 6' are removed, and then a new laminated conductive film 6' and a new resist pattern 15 are formed by the steps shown in FIGS. 4 to 7. This recreation step is the photo rework process.

Figure 14:
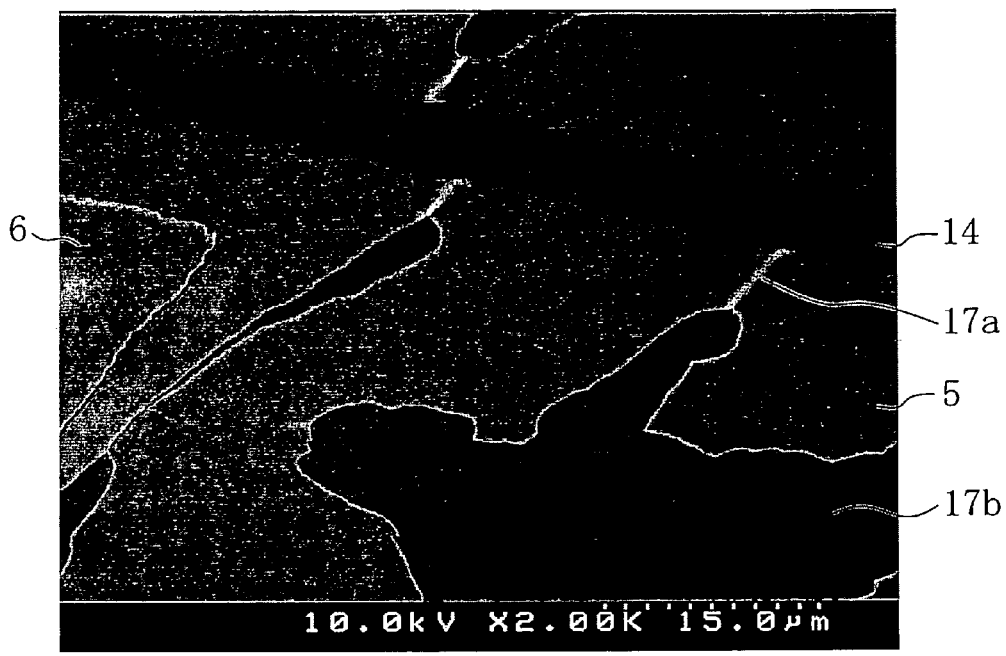
FIG. 14 is an electron micrograph illustrating the vicinity of a reflecting electrode 6 formed after a photo rework process by the method according to Embodiment 1 of the present invention.

If the first etching step shown in FIG. 8 and the second etching step shown in FIG. 9 are carried out after the above-described photo rework process, part of the transparent electrode 5 may possibly raised or flaked off as indicated by references 17a and 17b as shown in FIG. 14. However, according to the method of Embodiment 2, the steps shown in FIGS. 11 to 13 follow the steps shown in FIGS. 4 to 7. Therefore, the transparent electrode 5 is covered with the conductive metal film (first conductive metal film) 6a' in the second etching step as described above, whereby the aqueous oxalic acid solution does not come into contact with the transparent electrode 5. This reduces the number of times of contact between the transparent electrode 5 and the etchant, thereby preventing the transparent electrode 5 from coming off.

In the second etching step of Embodiments 1 and 2, dipping the substrate into an aqueous oxalic acid solution and showering the aqueous oxalic acid solution onto the substrate are combined as needed. By so doing, the amorphous transparent conductive film (second conductive metal film) 6b' is etched with higher efficiency. Though taking a longer etching time, the dipping allows uniform etching of the surface of the substrate and gives excellent in-plane uniformity. On the other hand, the showering is carried out in a shorter etching time, but impairs the in-plane uniformity. In particular, if the substrate is placed immediately below the surface of the aqueous oxalic acid solution for dipping while the aqueous oxalic acid solution is showered onto the top surface of the substrate, the amorphous transparent conductive film (second conductive metal film) 6b' is etched in a shorter time and improves the in-plane uniformity. If the etching time or the in-plane uniformity of the amorphous transparent conductive film (second conductive metal film) 6b' is not taken into consideration, the amorphous transparent conductive film (second conductive metal film) 6b' may be etched by either dipping or showering.

In Embodiments 1 and 2, the aqueous oxalic acid solution is used as an etchant for etching the amorphous transparent conductive film (second conductive metal film) 6b'. However, an etchant capable of selectively etching the amorphous transparent conductive film only, for example, an aqueous boric acid solution, may be also used.

In Embodiments 1 and 2, auxiliary capacitor lines and auxiliary capacitor electrodes are omitted. However, they may be added to provide an auxiliary capacitor in parallel with the liquid crystal capacitor.

In Embodiments 1 and 2, explanation is given of a semi-transmissive liquid crystal display including a transparent electrode and a reflecting electrode for each pixel. However, the present invention is applicable to reflective liquid crystal displays in which a reflecting electrode is provided for each pixel. Not only to the formation of the reflecting electrode, the present invention may also be applied to the formation of various conductive elements such as gate lines, source lines and auxiliary capacitor lines.

In Embodiments 1 and 2, explanation is given of an active-driven liquid crystal display using the TFTs as switching elements. However, the present invention may also be applied to other active-driven liquid crystal displays provided with other triode elements than the TFTs or diode elements such as MIM (Metal Insulator Metal), as well as to passive-driven (multiplex) liquid crystal displays.

Now, explanation is given of actually performed experiments.

Figure 15:
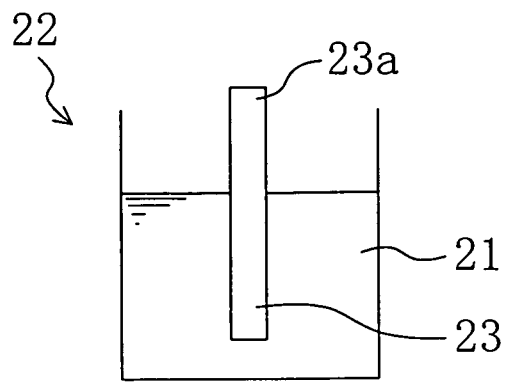
FIG. 15 is a schematic view illustrating how to conduct a first experiment for checking the etching characteristic of an aqueous oxalic acid solution with respect to various conductive films.
Figure 16:
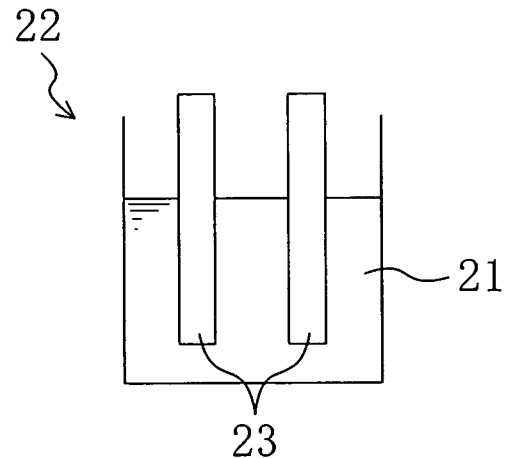
FIG. 16 is a schematic view illustrating how to conduct a second experiment for checking the etching characteristic of the aqueous oxalic acid solution with respect to various conductive films.
Figure 17:
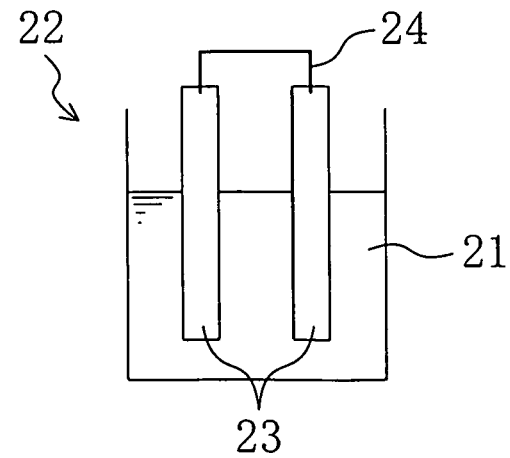
FIG. 17 is a schematic view illustrating how to conduct a third experiment for checking the etching characteristic of the aqueous oxalic acid solution with respect to various conductive films.

To examine the etching characteristic of an aqueous oxalic acid solution with respect to various conductive films (aluminum film, molybdenum film, ITO film and IZO film), experiments were carried out by the methods shown in FIGS. 15 to 17.

First, as shown in FIG. 15, samples 23 of the conductive films were dipped into an aqueous oxalic acid solution 21 in an etching bath 22 one by one to measure the amount of damage of the samples 23 per unit time (Å/sec).

Figure 18:
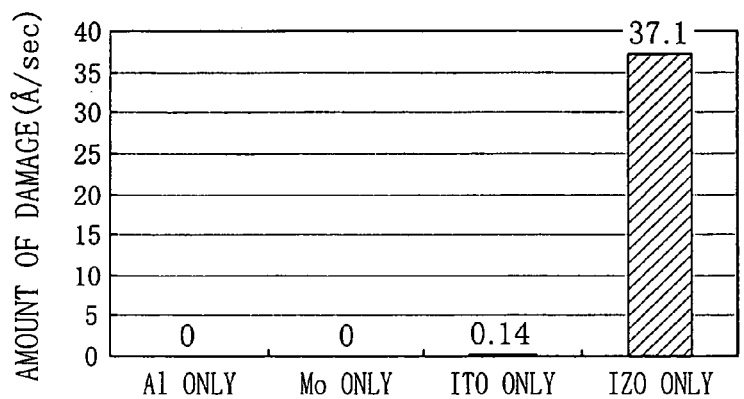
FIG. 18 is a graph illustrating the results of the first experiment for checking the etching characteristic of the aqueous oxalic acid solution with respect to various conductive films.

FIG. 18 is a graph of the measurement results. Referring to the graph, the aluminum film, molybdenum film and ITO film were hardly etched, but only the IZO film was etched. Thus, it was ascertained that the IZO film is selectively etched by the aqueous oxalic acid solution.

Second, as shown in FIG. 16, two of the conductive film samples 23 in combination for forming the actual laminated conductive film were dipped into the aqueous oxalic acid solution 21 in the etching bath 22 to measure the amount of damage of the samples 23 per unit time (Å/sec).

Figure 19:
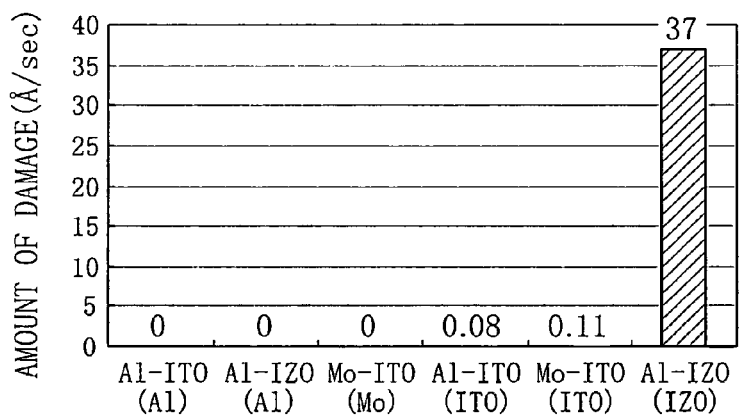
FIG. 19 is a graph illustrating the results of the second experiment for checking the etching characteristic of the aqueous oxalic acid solution with respect to various conductive films.

FIG. 19 is a graph of the measurement results. "Al/ITO (Al)" indicated along the horizontal axis of the graph signifies the amount of damage of the aluminum film per unit time (Å/sec) when the aluminum film and the ITO film were dipped simultaneously. "Al/ITO (IZO)" signifies the amount of damage of the IZO film per unit time (Å/sec) when the aluminum film and the IZO film were dipped simultaneously. According to the results, likewise the results of the first experiment, the aluminum film, molybdenum film and ITO film were hardly etched, but only the IZO film was etched. Thus, it was ascertained that the IZO film is selectively etched by the aqueous oxalic acid solution.

Third, as shown in FIG. 17, two of the conductive film samples 23 in combination for forming the actual laminated conductive film were dipped into the aqueous oxalic acid solution while they were connected to each other via a lead 24 to measure the amount of damage of the samples 23 per unit time (Å/sec). In this experiment, the two samples 23 were connected via the lead 24. Therefore, if electrolysis is caused by a potential difference between the connected samples 23, electrolytic corrosion (etching) is promoted.

Figure 20:
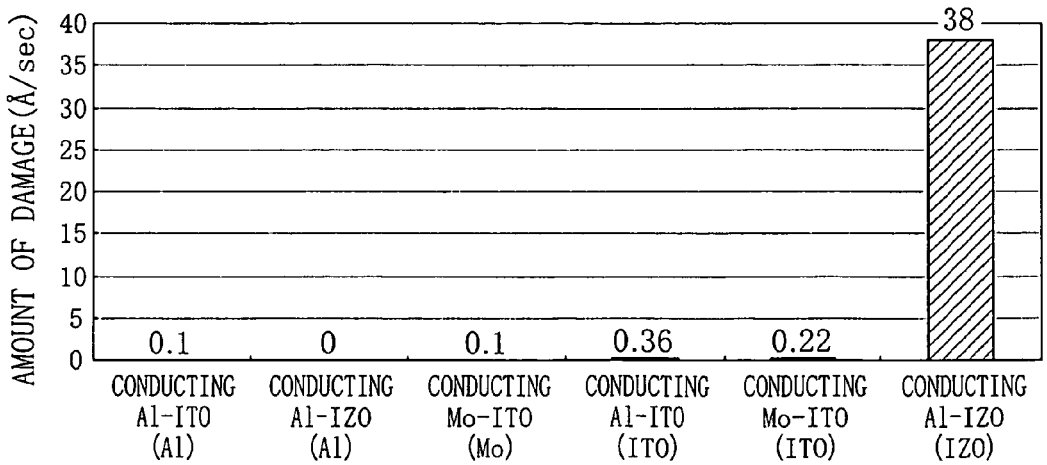
FIG. 20 is a graph illustrating the results of the third experiment for checking the etching characteristic of the aqueous oxalic acid solution with respect to various conductive films.

FIG. 20 is a graph of the measurement results. "Conducting Al/IZO (IZO)" indicated along the horizontal axis of the graph signifies the amount of damage of the IZO film per unit time (Å/sec) when the connected aluminum film and IZO film were dipped simultaneously. Likewise the first and second experimental results described above, the aluminum film, molybdenum film and ITO film were hardly etched, but only the IZO film was etched. Thus, it was ascertained that the IZO film is selectively etched by the aqueous oxalic acid solution. In the measurement of conducting Al/ITO (ITO) and conducting Mo/ITO (ITO), electrolytic corrosion was slightly observed. However, the etched amount observed in the measurement of the conducting Al/ITO (ITO) was as small as 54 Å, which had little effect on the film quality.

As an example of Embodiments of the present invention, a reflecting electrode 6 was formed in the same manner as described in Embodiments 1 and 2. More specifically, a molybdenum film, an aluminum film and an IZO film were formed in sequence using a DC magnetron sputtering device. In this experiment, "IZO target" manufactured by Idemitsu Kosan Co., Ltd. was used as the IZO film. The IZO film was etched with a 3 to 8 wt % aqueous oxalic acid solution of 40 to 45° C. for 2 to 500 seconds.

Figure 21:
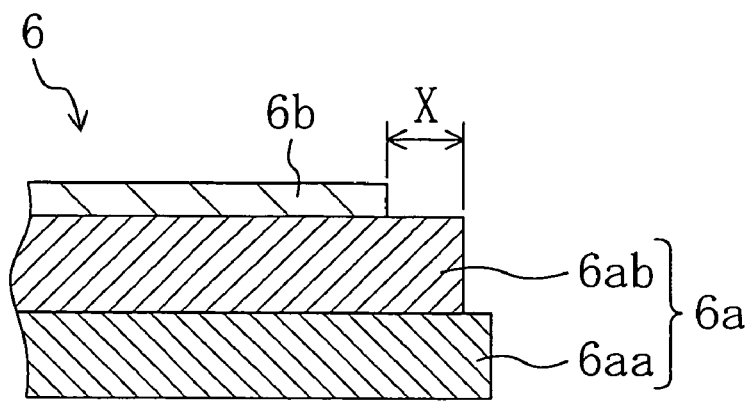
FIG. 21 is a schematic sectional view illustrating a reflecting electrode 6 of an exemplary active matrix substrate.

FIG. 21 is a schematic section view of the thus formed reflecting electrode 6.

The reflecting electrode 6 is constituted of a conductive metal layer (first conductive metal layer) 6a including a molybdenum layer 6aa and an aluminum layer 6ab and an amorphous transparent conductive layer (IZO layer) 6b as the second conductive metal layer.

TABLE 1

| Oxalic acid etching time (sec) | | 150 | 230 | 300 |
|---|---|---|---|---|
| X (μm) | First etching → second etching | 0.5 | — | — |
| | Second etching → first etching | 0.0 | 0.4 | 0.8 |

Table 1 shows the etch-back amount X (μm) of the IZO film etched with the aqueous oxalic acid solution in the example.

As shown in Table 1, when the first and second etching steps were carried out in this order, the etch-back amount X was 0.5 μm after the etching time of 150 sec. On the other hand, when the first and second etching steps were carried out in a reverse order, it took more than 230 sec to reach the etch-back amount of 0.5 μm. Thus, it was ascertained that the latter way takes longer etching time than the former way as described in Embodiments 1 and 2.

The reflecting electrode 6 including the IZO film etched with the aqueous oxalic acid solution was observed using a scanning electron microscope. As a result, the boundary of the IZO layer 6b was clearly recognized. In the conventional method for forming the reflecting electrode, the edge portions of the IZO layer 6b may protrude more outward than those of the underlying layer. Or alternatively, the reflecting electrode 6 may be substantially tapered downward from the farthest layer from the substrate, i.e., the edge portions of the reflecting electrode 6 may be slightly tapered such that the thickness thereof decreases in descending direction toward the ends thereof. Therefore, the boundary of the IZO layer 6b was not clearly recognized.

Next, other embodiments of the present invention will be described.

Embodiment 3

Figure 22:
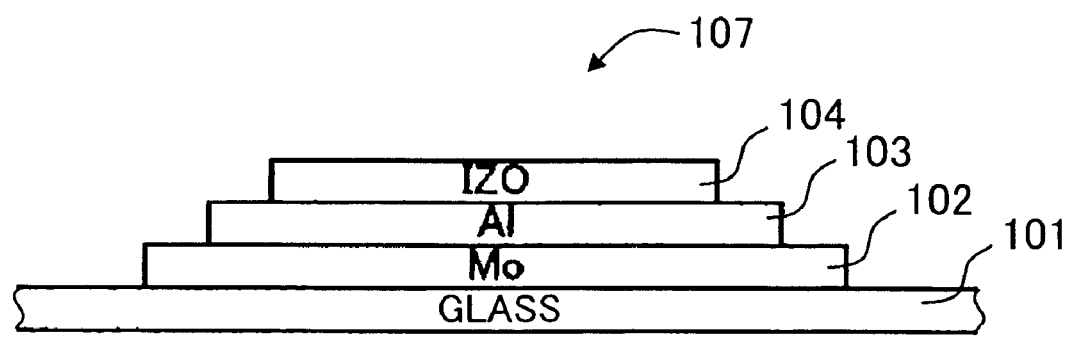
FIG. 22 is a sectional view illustrating a basic configuration of electrodes and wires on an electrode wiring substrate (conductive element substrate) according to Embodiment 3.

FIG. 22 is a sectional view of a major part illustrating a schematic configuration of an electrode wiring substrate (conductive element substrate) according to Embodiment 3.

As shown in FIG. 22, the electrode wiring substrate 107 includes a glass substrate 101 provided with an IZO layer (second conductive metal layer) 104 which is formed as an uppermost layer having a lower etch rate and an aluminum (Al) layer (first conductive metal layer) 103 and a molybdenum (Mo) layer (first conductive metal layer) 102 which are formed as a lower layer having a higher etch rate. When viewed in cross section, the uppermost IZO layer (second conductive metal layer) 104 is more narrowed in the horizontal direction than the underlying Al layer (first conductive metal layer) 103 and Mo layer (first conductive metal layer) 102. The thus obtained layered structure has a cross section which is substantially tapered upward from the closest layer to the substrate, thereby providing a layered electrode and/or wire in which the lower layer has higher film strength.

Hereinafter, a method for manufacturing the electrode wiring substrate 107 of Embodiment 3 will be described with reference to FIGS. 23 to 31.

FIGS. 23 to 31 are sectional views of major parts illustrating the steps of manufacturing the electrode wiring substrate 107 of Embodiment 3.

Figure 23:
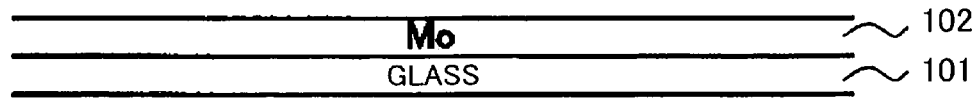
FIG. 23 is a sectional view illustrating the step of forming a Mo film in the method for manufacturing the electrode wiring substrate (conductive element substrate) according to Embodiment 3.

First, as shown in FIG. 23, a Mo film (first conductive metal film) 102 of 2000 Å in thickness is formed on the glass substrate 101 by sputtering.

Figure 24:
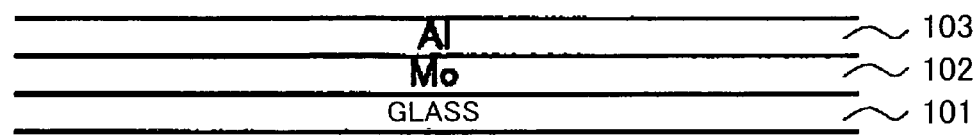
FIG. 24 is a sectional view illustrating the step of forming an Al film in the method for manufacturing the electrode wiring substrate (conductive element substrate) according to Embodiment 3.

On the Mo film 102, the Al film (first conductive metal film) 103 of 2000 Å in thickness is formed by sputtering as shown in FIG. 24.

Figure 25:
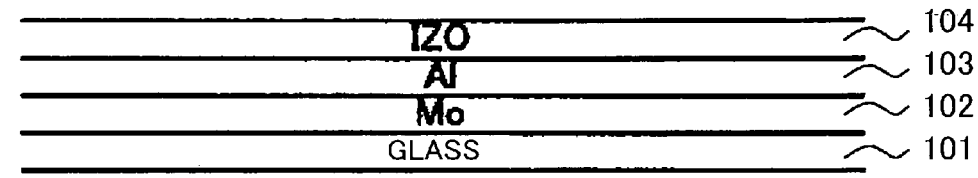
FIG. 25 is a sectional view illustrating the step of forming an IZO film in the method for manufacturing the electrode wiring substrate (conductive element substrate) according to Embodiment 3.

On the Al film 103, the IZO film (second conductive metal film) 104 of 100 Å in thickness is formed by sputtering as shown in FIG. 25.

Figure 26:
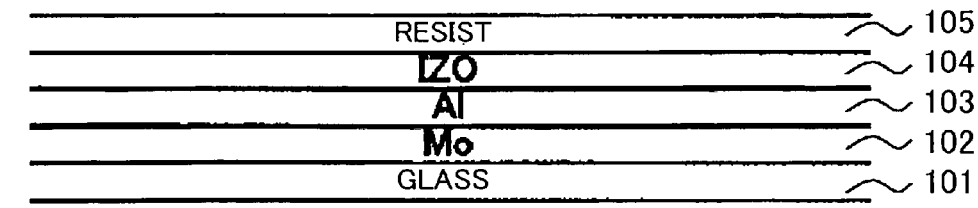
FIG. 26 is a sectional view illustrating the step of forming a resist film in the method for manufacturing the electrode wiring substrate (conductive element substrate) according to Embodiment 3.
Figure 27:
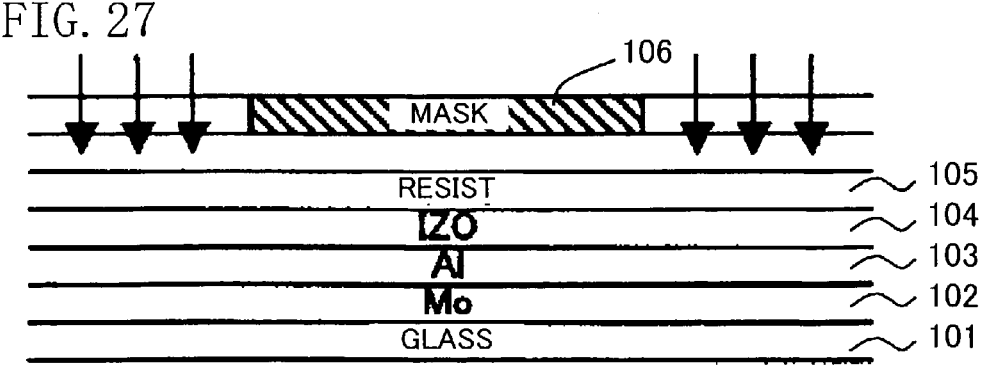
FIG. 27 is a sectional view illustrating the step of light exposure in the method for manufacturing the electrode wiring substrate (conductive element substrate) according to Embodiment 3.
Figure 28:
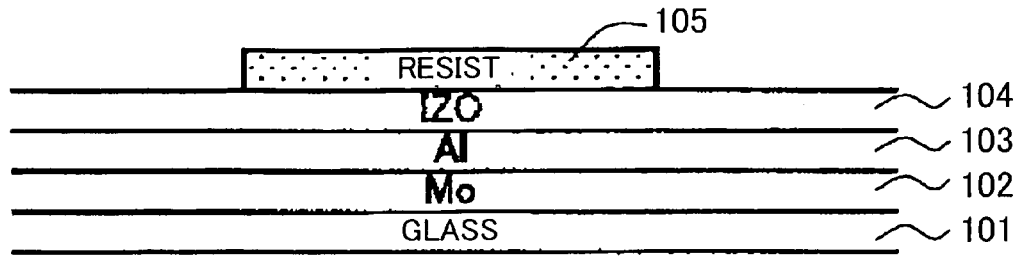
FIG. 28 is a sectional view illustrating the step of patterning the resist film in the method for manufacturing the electrode wiring substrate (conductive element substrate) according to Embodiment 3.

On the IZO film 104, a resist is applied by spin coating to form a resist film 105 of about 2 μm in thickness as shown in FIG. 26. Then, using a desired photomask 106 shown in FIG. 27, the resist film 105 is patterned into a desired configuration as shown in FIG. 28 by photolithography.

Figure 29:
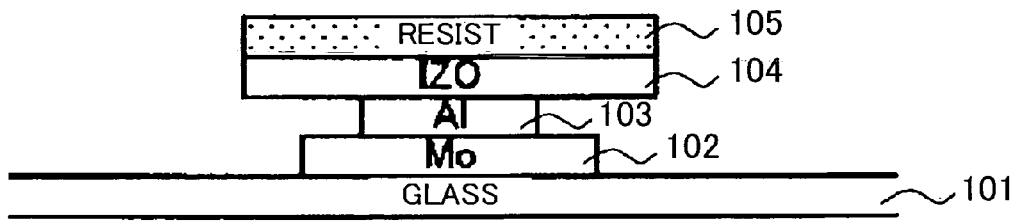
FIG. 29 is a sectional view illustrating a first etching step in the method for manufacturing the electrode wiring substrate (conductive element substrate) according to Embodiment 3.

Then, the thus prepared substrate is subjected to a first etching step, i.e., a combination of showering/dipping using a mixed solution of nitric acid, phosphoric acid, acetic acid and water as a first etchant capable of etching the Mo layer 102, Al layer 103 and IZO layer 104. By so doing, when viewed in cross section as shown in FIG. 29, the uppermost IZO layer 104 becomes larger in horizontal (lateral) direction than the middle Al layer 103 and the undermost Mo layer 102. Thus, the layered structure is substantially tapered downward from the farthest layer from the glass substrate when viewed in cross section.

Figure 30:
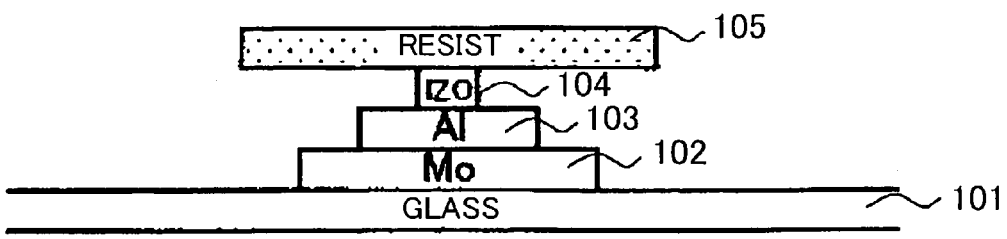
FIG. 30 is a sectional view illustrating a second etching step in the method for manufacturing the electrode wiring substrate (conductive element substrate) according to Embodiment 3.

Further, the thus prepared substrate is subjected to a second etching step, i.e., a combination of showering/dipping using an aqueous oxalic acid solution as a second etchant capable of selectively etching the IZO layer 104 immediately below the resist film 105 of a desired configuration. By so doing, when viewed in cross section as shown in FIG. 30, the uppermost IZO layer (second conductive metal layer) 104 becomes narrower than the middle Al layer (first conductive metal layer) 103 and the undermost Mo layer (first conductive metal layer) 102. Thus, the layered structure is substantially tapered upward from the closest layer to the glass substrate when viewed in cross section, thereby giving higher film strength to the lower layer.

Figure 31:
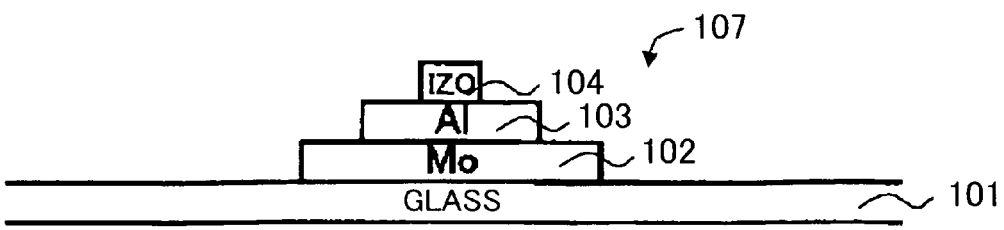
FIG. 31 is a sectional view illustrating a peeling step in the method: for manufacturing the electrode wiring substrate (conductive element substrate) according to Embodiment 3.

Then, the resist film 105 remaining at the top of the substrate is removed to provide the electrode wiring substrate 107 whose cross section is substantially tapered upward from the closest layer to the glass substrate as shown in FIG. 31.

Figure 32:
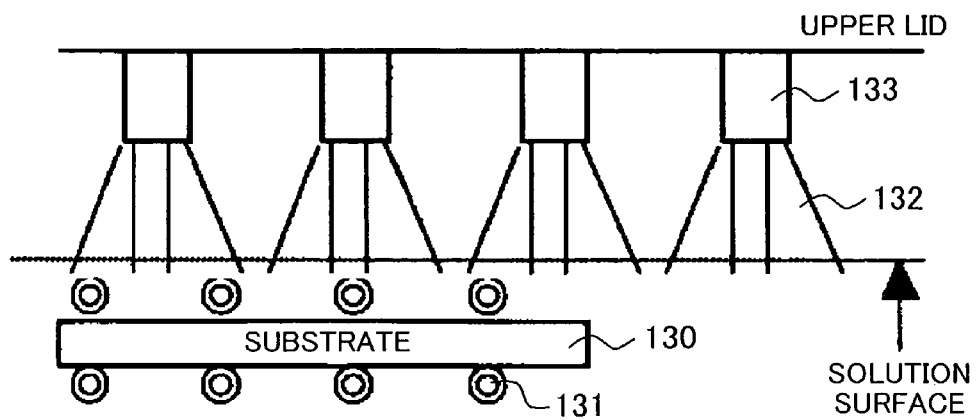
FIG. 32 is a sectional view of an etching bath for illustrating an etching step according to Embodiment 3.

The above-described etching steps will be described in detail with reference to FIG. 32. FIG. 32 is a sectional view of a major part of an etching bath for illustrating the etching steps according to Embodiment 3. The etching bath includes rollers 131 capable of conveying the substrate 130 which is kept dipped into an etchant 132 and nozzles. 133 for showering the etchant 132 onto the substrate 130.

In this etching step, as shown in FIG. 32, the substrate 130 is conveyed into the etching bath by the rollers 131. By the combination of showering and dipping, the etchant 132 adheres to the surface of the substrate 130 provided with the layers (top surface as viewed in the figure) to etch the metal layers formed on the top surface of the substrate 130 in sequence. By the showering, the etchant 132 is showered in the direction of the film thickness and adheres to the top surface of the substrate 130. By the dipping, the substrate 130 is placed below the surface of the etchant 132 such that the etchant 132 adheres to the top surface of the substrate 130.

The etching step is described in further detail with reference to FIGS. 33 to 38.

Figure 33:
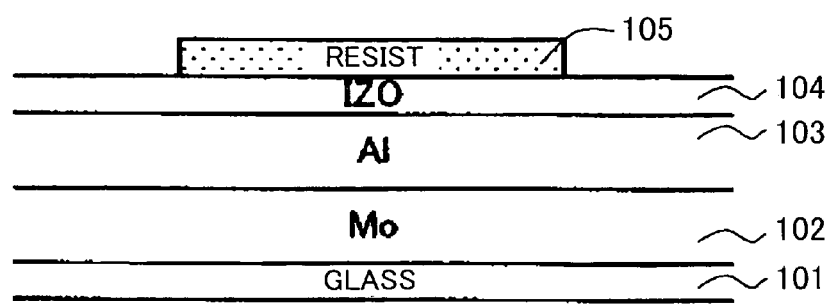
FIG. 33 is a sectional view illustrating the step of patterning a resist film in the method for manufacturing an electrode wiring substrate (conductive element substrate) according to Embodiment 4.
Figure 34:
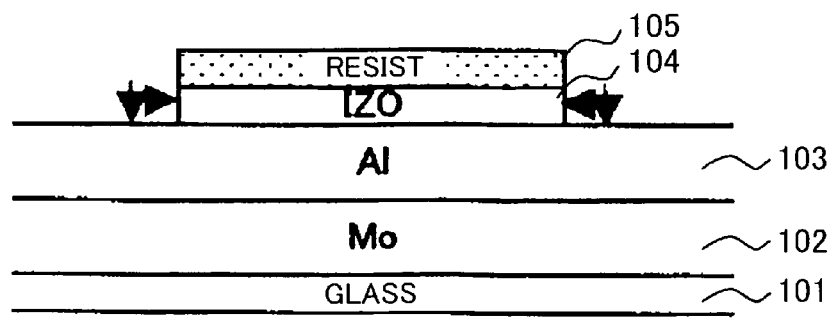
FIG. 34 is a first sectional view illustrating a first etching step in the method for manufacturing an electrode wiring substrate (conductive element substrate) according to Embodiment 4.

As shown in FIG. 33, after the patterning of the resist film 105, the first etching step is carried out using the first etchant capable of etching the uppermost IZO layer 104 and the underlying Al layer 103 and Mo layer 102. At this time, the IZO layer 104 is etched first. Since the IZO layer 104 is etched in the thickness direction at high etch rate, the etching of the IZO layer 104 in the thickness direction (longitudinal direction perpendicular to the layer surface) is completed while the etching of the IZO layer 104 in the horizontal direction (lateral direction parallel to the layer surface) proceeds slowly as shown in FIG. 34.

Figure 35:
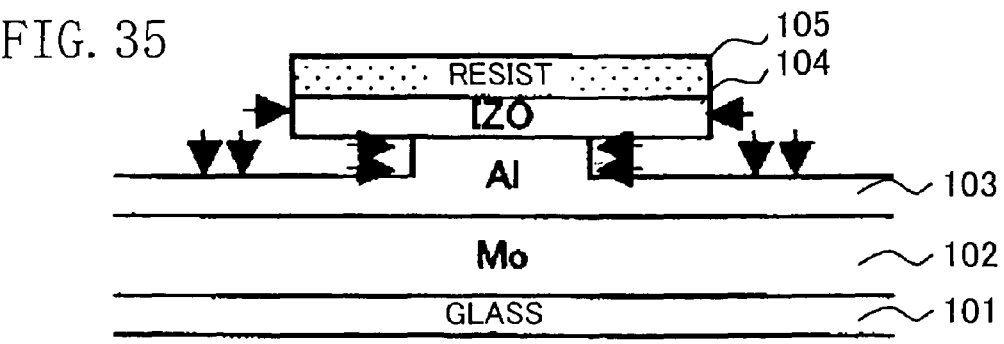
FIG. 35 is a second sectional view illustrating a first etching step in the method for manufacturing an electrode wiring substrate (conductive element substrate) according to Embodiment 4.

Subsequently, the Al layer 103 is etched. Likewise the IZO layer 104, if showering and dipping are combined, the Al layer 103 is etched faster in the thickness direction while the etching of the IZO layer 104 in the horizontal (lateral) direction proceeds slowly. Therefore, as shown in FIG. 35, the Al layer 103 becomes narrower in the horizontal direction than the IZO layer 104 when viewed in cross section, whereby the resulting layered structure is substantially tapered downward from the farthest layer from the glass substrate when viewed in cross section.

Figure 36:
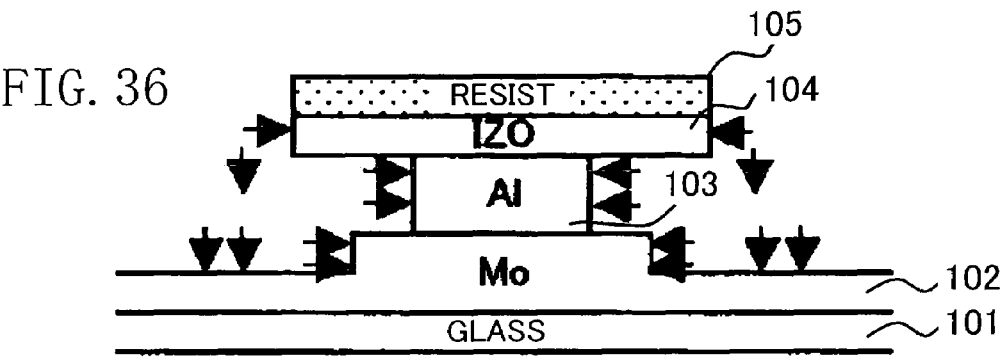
FIG. 36 is a third sectional view illustrating a first etching step in the method for manufacturing an electrode wiring substrate (conductive element substrate) according to Embodiment 4.

Thereafter, the Mo layer 102 is etched. Likewise the IZO layer 104 and the Al layer 103, if showering and dipping are combined, the Mo layer 102 is etched faster in the thickness (longitudinal) and horizontal directions and the Al layer 103 is etched faster in the horizontal direction while the etching of the IZO layer 104 in the horizontal (lateral) direction proceeds slowly. Therefore, as shown in FIG. 36, the Al layer 103 and the Mo layer 102 become narrower in the horizontal direction than the IZO layer 104 when viewed in cross section, whereby the resulting layered structure is substantially tapered upward from the closest layer to the glass substrate when viewed in cross section.

Figure 37:
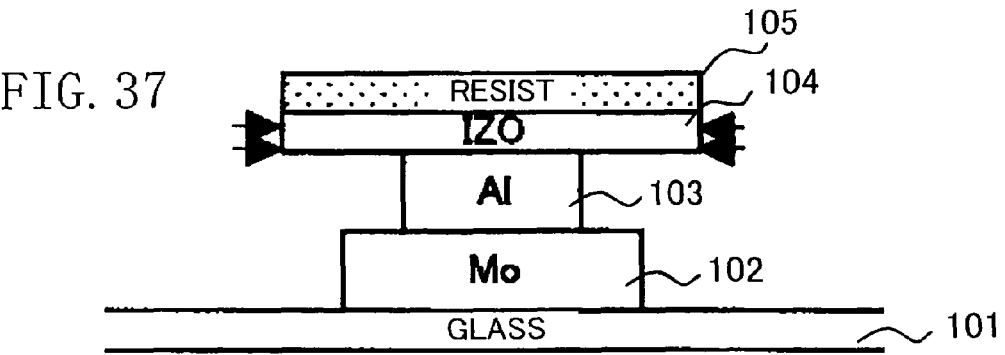
FIG. 37 is a first sectional view illustrating a second etching step in the method for manufacturing an electrode wiring substrate (conductive element substrate) according to Embodiment 4.
Figure 38:
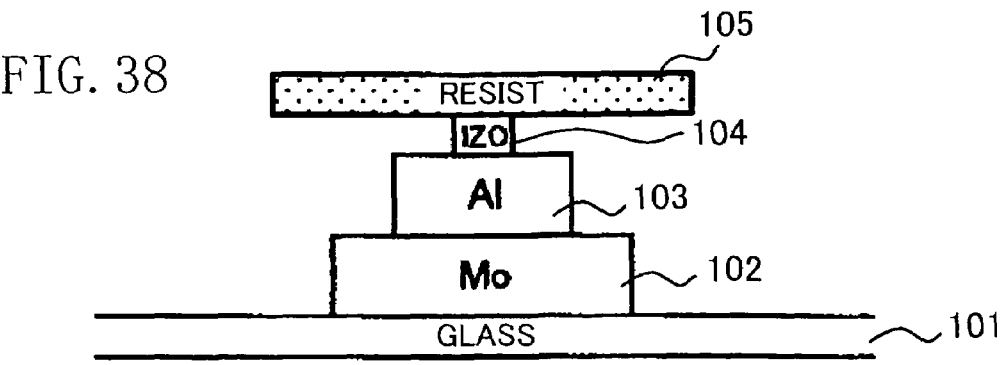
FIG. 38 is a second sectional view illustrating a second etching step in the method for manufacturing an electrode wiring substrate (conductive element substrate) according to Embodiment 4.

In the second etching step, etching is carried out using the second etchant capable of selectively etching the IZO layer 104 without causing damage to the Al layer 103 and the Mo layer 102. Then, as shown in FIG. 37, the IZO layer 104 becomes narrower in horizontal direction than the Al layer 103 and the Mo layer 102 when viewed in cross section, whereby the resulting layered structure is substantially tapered upward from the closest layer to the glass substrate when viewed in cross section.

Thus, according to Embodiment 3, the first etching step is carried out using the first etchant capable of etching the uppermost layer whose etch rate is low (second conductive metal film) and the lower layers whose etch rate is high (first conductive metal films), and then the second etching step is carried out using the second etchant capable of selectively etching the uppermost layer. By so doing, the three-layered structure which is substantially tapered upward from the closest layer to the substrate is obtained with high film strength and resistance to coming off of the film. As long as the layered structure having the upward-tapered cross section as shown in FIG. 31 is obtained, high film strength is maintained even if the structure is a finally obtained one or additional manufacturing steps are carried out thereto. As a result, failures such as leakage and a break of wires caused by coming off of the film are reduced, thereby improving the manufacturing yield.

Figure 46:
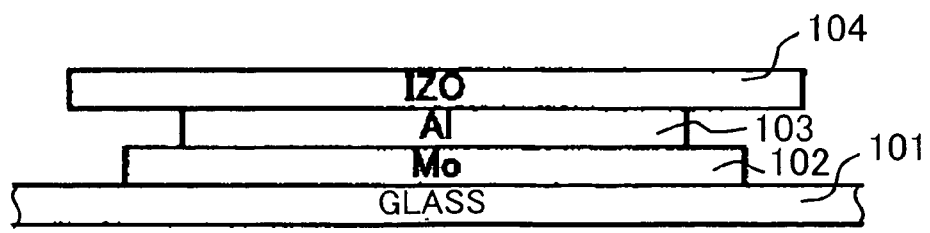
FIG. 46 is a sectional view illustrating a cross section of a conventional electrode or wire on a substrate.
Figure 47:
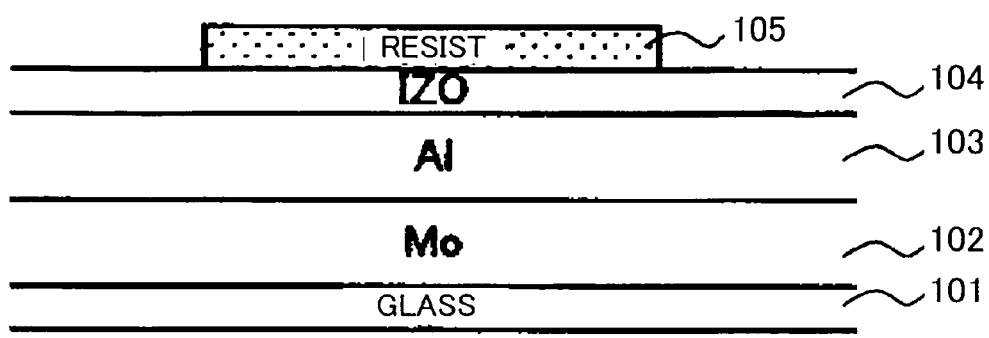
FIG. 47 is a sectional view illustrating a conventional etching step (patterning of a resist film).
Figure 48:
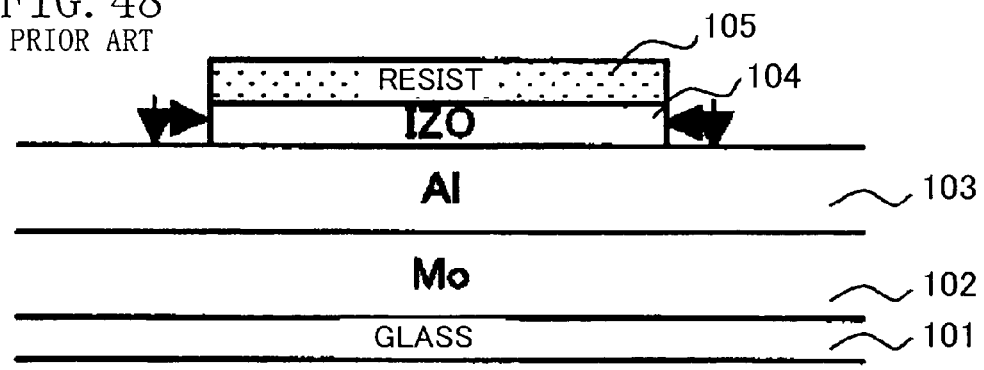
FIG. 48 is a sectional view illustrating a conventional etching step (etching of an IZO film).
Figure 49:
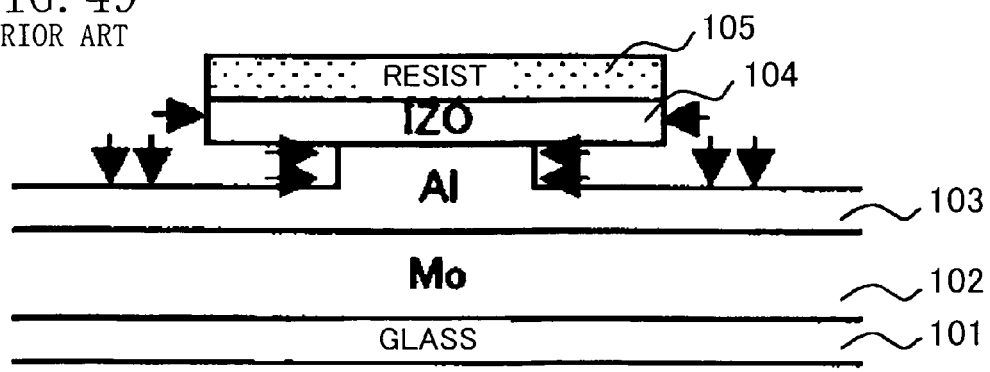
FIG. 49 is a sectional view illustrating a conventional etching step (etching of IZO film/Al film).
Figure 50:
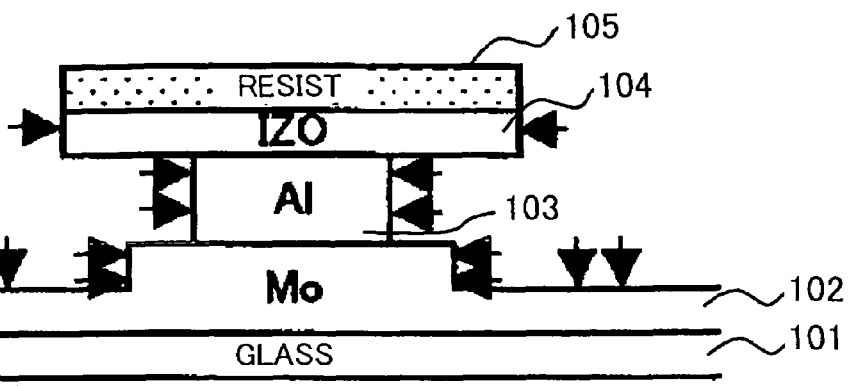
FIG. 50 is a first sectional view illustrating a conventional etching step (etching of IZO film/Al film/Mo film).
Figure 51:
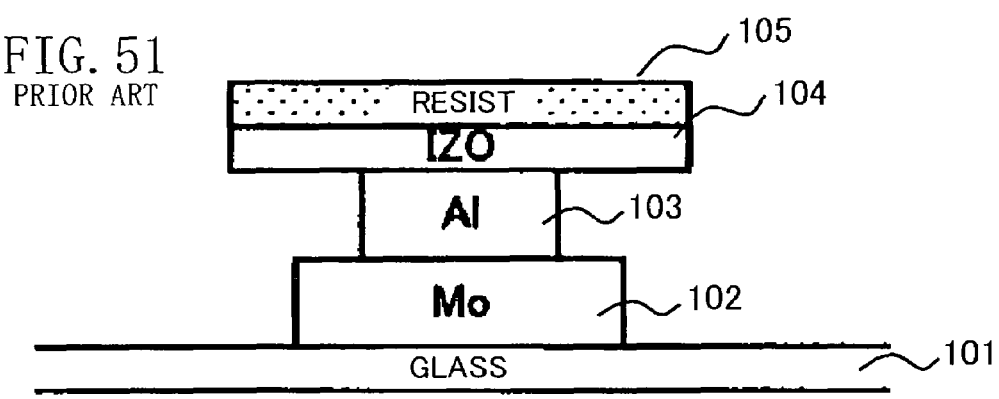
FIG. 51 is a sectional view illustrating a conventional etching step (etching of the Mo film).
Figure 52:
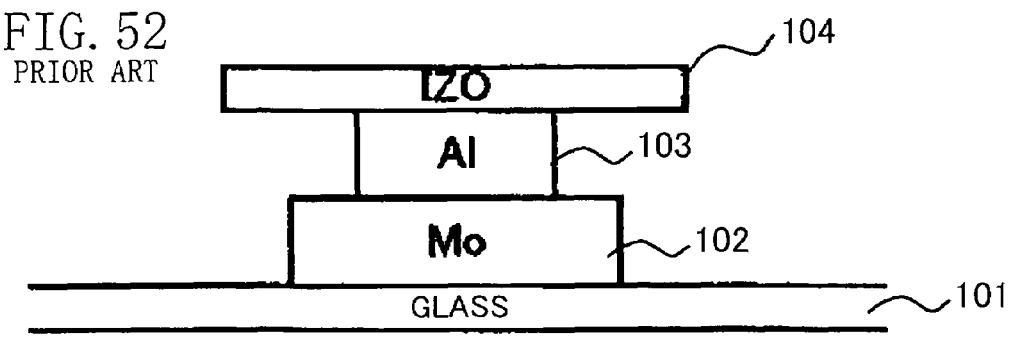
FIG. 52 is a first sectional view illustrating a conventional etching step (removal of a resist film).

In the first etching step, etching is carried out by a combination of showering and dipping. However, it may be carried out by either showering or dipping. If the etching is carried out mainly by dipping, the cross section of the resulting layered structure is substantially tapered downward from the farthest layer from the substrate as shown in FIG. 46. On the other hand, if the etching is carried out mainly by showering, the cross section of the resulting layered structure is substantially tapered upward from the closest layer to the substrate as shown in FIG. 22. In either case, if the second etching step is carried out onto the uppermost layer using the second etchant capable of selectively etching the uppermost layer, the upward-tapered cross section as shown in FIG. 22 is obtained with high film strength.

The second etching step may also be carried out by not only the combination of dipping and showering, but also either dipping or showering. In either method, the second etching step allows obtaining a layered structure of excellent configuration. With a view to improving performance of the etching device and in-plane uniformity, the second etching step is preferably carried out by the combination of dipping and showering such that the IZO layer 104 is etched at high etch rate.

Embodiment 4

Embodiment 4 is directed to a liquid crystal display and a manufacturing method thereof based on the electrode wiring substrate (conductive element substrate) and the manufacturing method thereof according to Embodiment 3.

Figure 39:
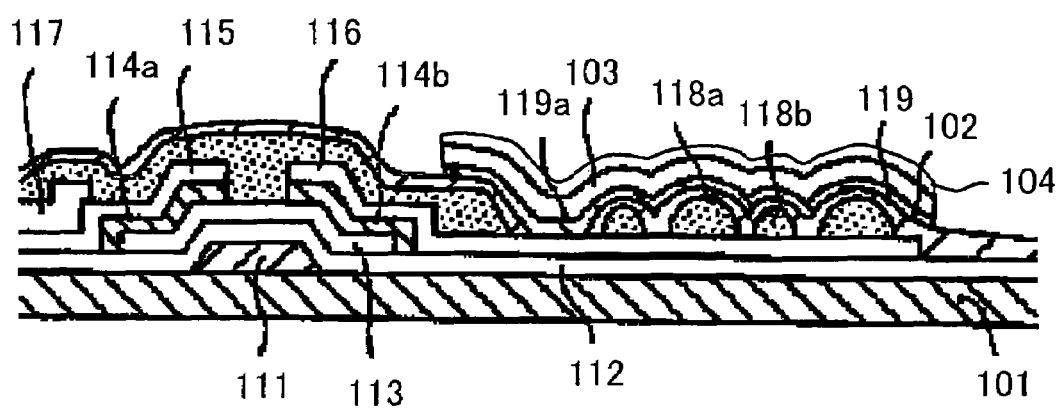
FIG. 39 is a sectional view illustrating a schematic configuration of a liquid crystal display according to Embodiment 4, including a reflecting electrode and a TFT in a pixel region.
Figure 40:
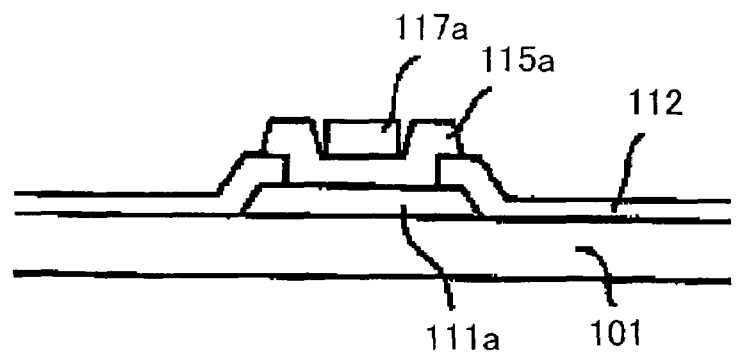
FIG. 40 is a sectional view illustrating a schematic configuration of the liquid crystal display according to Embodiment 4, including a terminal region.

FIGS. 39 and 40 are sectional views of major parts illustrating a schematic configuration of the liquid crystal display of Embodiment 4.

In a pixel region formed on one of substrates opposed to each other to sandwich a liquid crystal layer, a reflecting electrode made of Al, a transmissive electrode made of ITO and a TFT for switching between the electrodes are formed. FIG. 39 shows part of the pixel region including the reflecting electrode and the TFT. FIG. 40 shows a terminal region formed on the same substrate in which a connection terminal electrode made of ITO is formed for connection with a driver installed at the end of the substrate.

As shown in FIG. 39, the substrate includes an insulating glass substrate 101 formed with a plurality of gate bus lines (not shown) serving as scan lines and a plurality of source bus lines (not shown) serving as signal lines. The gate bus lines and the source bus lines are arranged orthogonal to each other. In each pixel region divided by the gate bus lines and the source bus lines, a reflecting electrode made of an Al layer 103 and a transmissive electrode (not shown) made of an ITO layer are provided as a pixel electrode.

In the reflecting electrode, a Mo layer 102 is formed below the Al layer 103 to prevent electrolysis between the Al layer and the ITO layer. Further, an IZO layer 104 is formed on the Al layer 103 so that a work function of the reflecting electrode approaches that of a counter (common) electrode made of ITO.

In the pixel region, a gate electrode 111 is branched from the gate bus line toward the pixel electrode and a TFT serving as a switching element is provided at the tip portion of the gate electrode 111.

The TFT is formed on the gate electrode 111 formed on the glass substrate 101. The gate electrode 111 is covered with a gate insulating film 112. On the gate insulating film 112, a semiconductor layer 113 is formed to be opposed to the gate electrode 111 and contact layers 114a and 114b are formed to overlap the both sides of the semiconductor layer 113, respectively. Further, a source electrode 115 branched from the source bus-line toward the TFT overlaps the contact layer 114a to constitute part of the TFT. The source bus line includes the same metal layer as that of the source electrode 115 and an ITO layer 117 formed thereon. Thus, the source bus line has a two-layered structure.

On the contact layer 114b, a drain electrode 116 of the TFT is arranged separately from the source electrode 115. The drain electrode 116 is extended to establish connection with the transmissive electrode made of an ITO layer (not shown) and the reflecting electrode made of the Mo layer (first conductive metal layer) 102, Al layer (first conductive metal layer) 103 and IZO layer (second conductive metal layer) 104 via a contact hole 119a formed in an interlayer insulating film 119. Below the interlayer insulating film 119 in the area of the reflecting electrode, bumps 118a and 118b having a substantially cylindrical cross section are formed for excellent reflection characteristic.

In the terminal region, as shown in FIG. 40, a metal layer 111a made of the same material as the gate bus line is formed on the glass substrate 101. Further, a metal layer 115a which is the same as that of the source bus line and the source electrode 115 and an ITO layer 117a are laminated over an opening formed in the gate insulating film 112 covering the metal layer 111a.

Hereinafter, with reference to FIGS. 41 to 44, explanation is given of a method for manufacturing the thus configured substrate of the liquid crystal display according to Embodiment 4, i.e., an electrode wiring substrate (conductive element substrate).

Figure 41:
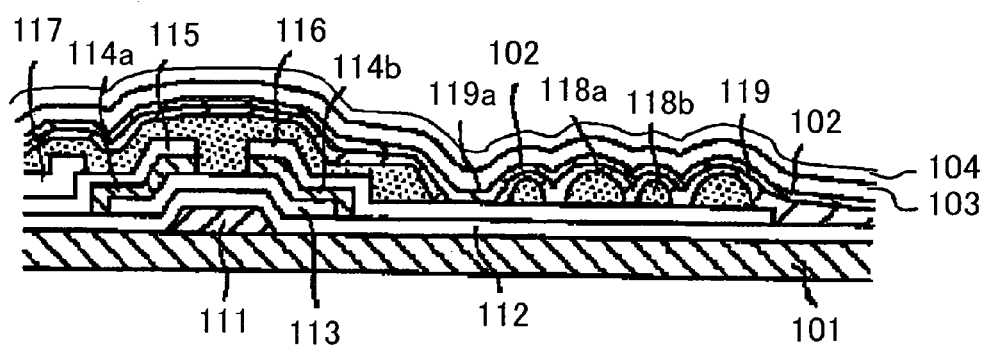
FIG. 41 is a sectional view illustrating a method for manufacturing the liquid crystal display according to Embodiment 4, including the reflecting electrode and the TFT in the pixel region.
Figure 42:
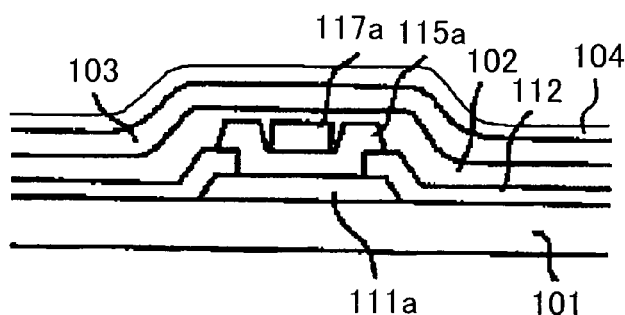
FIG. 42 is a sectional view illustrating the method for manufacturing the liquid crystal display according to Embodiment 4, including a terminal region.
Figure 43:
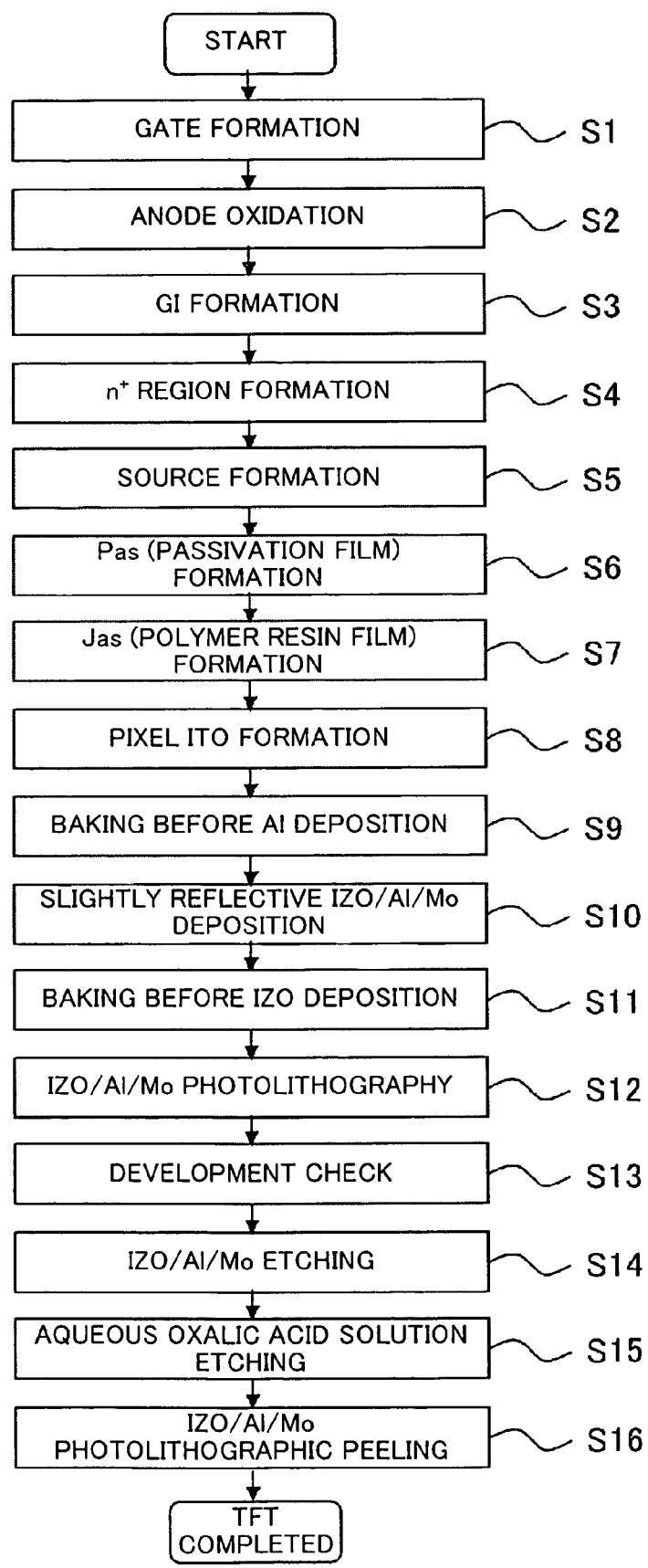
FIG. 43 is a flowchart for explaining the steps in the method for manufacturing the liquid crystal display according to Embodiment 4.

FIGS. 41 and 42 are sectional views of major parts illustrating a configuration of the liquid crystal display of Embodiment 4, while FIG. 43 is a flowchart for explaining the steps for manufacturing the liquid crystal display of FIGS. 41 and 42. Likewise FIG. 39, FIG. 41 shows the reflecting electrode and the TFT in part of the pixel region formed on one of substrates opposed to each other to sandwich a liquid crystal layer and formed with the reflecting electrode made of Al, the transmissive electrode made of ITO and the TFT for switching between the electrodes. Further, likewise FIG. 40, FIG. 42 shows a terminal region formed on the same substrate in which a connection terminal electrode made of ITO is formed for connection with a driver installed at the end of the substrate.

First, in a gate formation step S1 shown in FIG. 43, a plurality of gate bus lines made of Cr or Ta and gate electrodes 111 branched from the gate bus lines are formed on the glass substrate 101 as shown in FIG. 41. At this time, in the terminal region, a metal layer 111a made of the same material as the gate bus lines is formed on the glass substrate 101 as shown in FIG. 42.

Then, in an anode oxidation step S2, the surfaces of the gate bus lines, gate electrodes 111 and metal layer 111a are oxidized by an anodic oxidation method to form an anode oxidation film (not shown). The anode oxidation step is carried out as needed.

Then, in a GI (gate insulating film) formation step S3, a gate insulating film. 112 made of SiNx or SiOx is formed over the entire surface of the glass substrate 101 to cover the gate bus lines and the gate electrodes 111 as shown in FIG. 41. At this time, in the terminal region, the gate insulating film 112 is also formed to cover the metal layer 111a and an opening is formed above the center of the metal layer 111a by dry etching.

In an n+ region formation step S4, a semiconductor layer 113 made of amorphous silicon (a-Si) or polycrystalline silicon is formed on the gate insulating film 112. Thus, contact layers 114a and 114b made of n+ a-Si or the like are formed to overlap the both sides of the semiconductor layer 113, respectively, as shown in FIG. 41.

In a source formation step S5, a metal layer made of Ti for forming source bus lines is formed. Simultaneously, a source electrode 115 is formed to overlap the contact layer 114a and a drain electrode 116 is formed to overlap the contact layer 114b as shown in FIG. 41. The drain electrode 116 is formed to extend to the transmissive electrode and the reflecting electrode. In this step, in the terminal region, a metal layer 115a made of the same material as the source bus lines is formed to cover an opening in the gate insulating film 112 above the metal layer 111a as shown in FIG. 42.

In a pixel ITO formation step S8 after a Pas (passivation film) formation step S6 and a Jas (polymer resin film) formation step S7, an ITO layer 117 is formed on the metal layer 115 to form the source bus lines. Though not shown, the ITO layer will be formed into the transmissive electrode. Further, in the terminal region, the ITO layer 117a formed on the metal layer 115a will be a connection terminal electrode as shown in FIG. 42.

Then, bumps 118a and 118b which are made of a photosensitive resin and have a smooth surface and a substantially round cross section are formed to be arranged below the area of the reflecting electrode. Then, an interlayer insulating film 119 of 1000 Å in thickness such as a polymer resin film is formed thereon to give a smoother surface.

In a baking before Al deposition step S9, the substrate is subjected to baking.

In a slightly reflective IZO/Al/Mo deposition step S10, a Mo film (first conductive metal film) 102, an Al film (first conductive metal film) 103 and an IZO film (second conductive metal film) 104 are formed in this order as shown in FIGS. 41 and 42. Since the undermost Mo film 102 is used as a barrier metal for preventing electrolysis between the ITO (Indium Tin Oxide) layer previously formed on the substrate and the Al film 103, its thickness is preferably about 50 to 10000 Å. In Embodiment 4, the Mo film 102 is formed by sputtering to have a thickness of 2000 Å.

Since the middle Al film 103 is used as the reflecting electrode, a thickness of about 50 to 10000 Å is required to give high reflectance. In Embodiment 4, the Al film 103 is formed by sputtering to have a thickness of 2000 Å.

Since the uppermost IZO film 104 is formed on the reflecting electrode (Al film) to prevent display misalignment between the reflective mode (reflecting electrode region) and the transmissive mode (transmissive electrode region), its thickness is preferably about 10 to 200 Å. In Embodiment 4, the IZO film 104 is formed by sputtering to have a thickness of 100 Å. The thicknesses of these films may suitably be adjusted to exhibit their functions to a sufficient degree. Further, other methods for film formation such as vapor deposition may also be employed.

In a baking before IZO deposition step S11, the substrate is subjected to baking.

In an IZO/Al/Mo photolithography step S12, a resist film of a desired configuration is formed by photolithography in the same manner as Embodiment 3. In this step, the resist film is formed on the IZO film (second conductive metal film) 104, Al film (first conductive metal film) 103 and Mo film (first conductive metal film) 102 in the pixel region, but not on the terminal region.

In a development check step S13, an inspection is carried out as to whether or not the resist film is properly patterned into a desired configuration.

In an IZO/Mo/Al etching step S14, first etching is carried out using a mixed solution of nitric acid, phosphoric acid, acetic acid and water as the first etchant capable of etching the Mo film (first conductive metal film) 102, Al film (first conductive metal film) 103 and IZO film (second conductive metal film) 104. The first etching is carried out by a combination of dipping and showering, or either dipping or showering. If the etching is carried out mainly by dipping, the resulting layered structure will have a cross section which is substantially tapered downward from the farthest layer from the glass substrate as shown in FIG. 46. On the other hand, if the etching is carried out mainly by showering, the resulting layered structure will have a cross section which is substantially tapered upward from the closest layer to the glass substrate as shown in FIG. 22. The mixing ratio of the first etchant may suitably be adjusted. Other etchants may be used as the first etchant as long as the IZO film, Al film and Mo film are etched at one time.

In an aqueous oxalic acid solution etching step S15, second etching is carried out using an aqueous oxalic acid solution as the second etchant capable of selectively etching the IZO layer (second conductive metal layer) 104. The second etching is carried out by a combination of dipping and showering, or either dipping or showering. In either etching method, the second etching allows obtaining the upward-tapered cross section as shown in FIG. 22. However, with a view to improving the performance of the etching device and in-plane uniformity, the second etching is preferably carried out by the combination of dipping and showering such that the IZO layer (second conductive metal layer) 104 is etched at high etch rate. Other etchants may be used as the second etchant as long as the IZO layer (second conductive metal layer) 104 is selectively etched without causing damage to the Al and Mo layers.

Through steps S14 and S15 described above, a reflecting electrode made of the IZO layer (second conductive metal layer) 104, Al layer (first conductive metal layer) 103 and Mo layer (first conductive metal layer) 102 is formed in the pixel region as shown in FIG. 39. Further, as shown in FIG. 40, the IZO layer (second conductive metal layer) 104, Al layer (first conductive metal layer) 103 and Mo layer (first conductive metal layer) 102 in the terminal region are removed to expose the ITO layer 117a formed at the uppermost of the connection terminal electrode.

Then, in an IZO/Al/Mo photolithographic peeling step S16, the resist film remaining on the substrate is removed, thereby completing the reflecting electrode whose cross section is substantially tapered upward from the closest layer to the glass substrate as shown in FIG. 22. Thus, the manufacture of the TFT is completed.

In Embodiment 4, the first etching is carried out by showering the first etchant onto the substrate such that etching proceeds predominantly in the film thickness direction, and then the uppermost IZO layer (second conductive metal layer) 104 is selectively etched using the second etchant having selectivity to the IZO layer. This allows manufacture of an electrode or wire of a three-layered structure having high film strength and the upward-tapered cross section as shown in FIG. 22.

With respect to the substrate provided with the patterned IZO layer (second conductive metal layer) 104, Al layer (first conductive metal layer) 103 and Mo layer (first conductive metal layer) 102 according to Embodiments 3 and 4, a peel test was carried out as described below to examine adhesion strength of the layers (reference: "Techniques for Evaluation of Kinetic Property of Thin Film" edited by Akira Kinbara, Akio Kouno, Fumiya Shoji, Shigeru Baba, REALIZE INC.).

First, a tape of about 1 $cm^2$ is affixed to the substrate provided with the patterned IZO layer 104, Al layer 103 and Mo layer 102. Then, the tape is peeled off by pulling it with a constant force in the direction perpendicular to the substrate. Adhesion strength of the patterned IZO layer 104, Al layer 103 and Mo layer 102 is determined by how much these layers are peeled off at this time. The patterned IZO layer 104, Al layer 103 and Mo layer 102 vary in size from several μm to several mm depending on the desired definition. In this test, used was a substrate on which the layers have been patterned at a several hundred μm pitch according to Embodiment 4.

Figure 44:
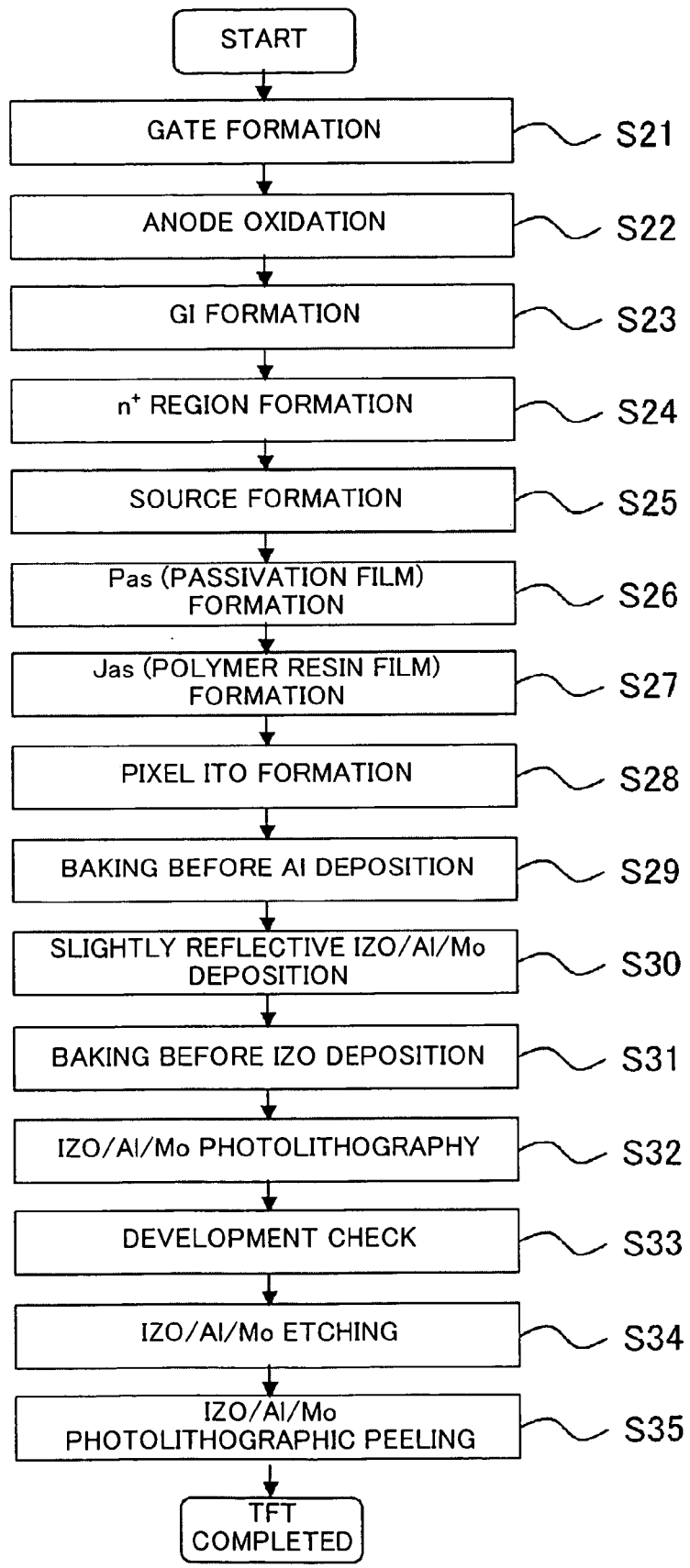
FIG. 44 is a flowchart for explaining the steps in the method for manufacturing a liquid crystal display in comparison with the liquid crystal display of Embodiment 4.
Figure 45:
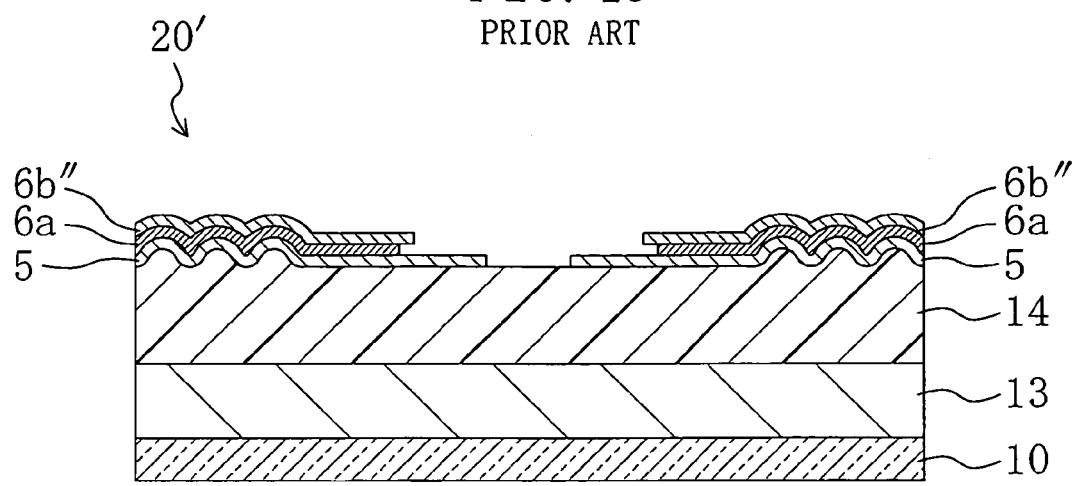
FIG. 45 is a schematic sectional view of an active matrix substrate 20' provided with reflecting electrodes formed by a conventional method.

For comparison, the same examination of adhesion strength was carried out with respect to a substrate provided with the IZO layer 104, Al layer 103 and Mo layer 102 which have been patterned along the flowchart of FIG. 44, which lacks the aqueous oxalic acid solution etching step S15 shown in FIG. 43. Steps S21 to S33 and S35 in FIG. 44 are the same as steps S1 to S13 and S16 in FIG. 43 of Embodiment 4. The flowchart of FIG. 44 is different from that of FIG. 43 in that only the first etching is carried out in step S34 but the second etching is not. In the method of FIG. 44, the resulting reflecting electrode is substantially tapered downward from the farthest layer from the substrate when viewed in cross section as shown in FIG. 46.

On the substrate on which the IZO layer (second conductive metal layer) 104, Al layer (first conductive metal layer) 103 and Mo layer (second conductive metal layer) 102 have been patterned by the first and second etching steps according to Embodiments 3 and 4 such that the resulting reflecting electrode has the upward-tapered cross section as shown in FIG. 22, the layers did not come off at all. On the other hand, on the comparative substrate on which the IZO layer 104, Al layer 103 and Mo layer 102 have been patterned only by the first etching (dipping) such that the resulting reflecting electrode has the downward-tapered cross section as shown in FIG. 46, the layers come off in about several tens of spots per 1 $cm^2$.

In the manufacture of a semi-transmissive liquid crystal display using the substrate provided with the thus formed reflecting electrode, a process for forming an alignment film will follow the formation of the reflecting electrode. The alignment film is formed by applying an alignment film material to the substrate by offset printing or spin coating, followed by curing and an alignment process called rubbing. That is, external shock is applied to the substrate provided with the patterned IZO layer (second conductive metal layer) 104, Al layer (first conductive metal layer) 103 and Mo layer (first conductive metal layer) 102. However, on the substrate provided with the IZO layer (second conductive metal layer) 104, Al layer (first conductive metal layer) 103 and Mo layer (first conductive metal layer) 102 which are patterned by the first and second etching steps according to Embodiment 4, the alignment film can be formed without causing coming off of the layers.

Thereafter, the substrate thus provided with the elements and the alignment film is bonded to a counter substrate made of a glass substrate formed with a color filter, counter (common) electrodes made of ITO and an alignment film, with the interposition of spacers. Then, a liquid crystal layer is injected between the bonded substrates. A phase difference plate and a polarizing plate are arranged on the counter substrate, thereby completing a liquid crystal display of both transmissive and reflective modes.

Thus, according to Embodiments 3 and 4, the Mo film (first conductive metal film) 102, Al film (first conductive metal film) 103 and IZO film (second conductive metal film) 104 are formed in sequence on the glass substrate 101 and these metal films are patterned using a plurality of etchants. In the first etching, the first etchant capable of etching the Mo film 102, Al film 103 and IZO film 104 is used. In the second etching, the second etchant capable of selectively etching the uppermost IZO layer 104 without causing damage to the Al layer 103 and the Mo layer 102 is used. By so doing, even if the uppermost layer is lower in etch rate than the underlying Al layer 103 and Mo layer 102, the underlying Al layer 103 and Mo layer 102 are prevented from thinning in the horizontal direction and coming off the substrate. Thus, an electrode and/or wire is obtained to have a cross section which is substantially tapered upward from the closest layer to the substrate.

In Embodiments 3 and 4 described above, the combination of the metal layers having different etch rates is not limited to the IZO layer, Al layer and Mo layer. The present invention may be applicable to layers of other materials as long as the resulting layered structure includes a metal layer which is lower in etch rate as an uppermost layer and one or more underlying layers which is higher in etch rate than the uppermost layer. The electrode or wire mentioned herein is explained to have a three-layered structure. However, the electrode or wire may have a two-layered structure or four or more-layered structure. If different metal materials are used, the combination of the first and second etchants will also be different. As the first etchant, an etchant capable of etching the uppermost layer and the underlying layer(s) may be used. As the second etchant, an etchant capable of etching the uppermost layer without causing damage to the underlying layer(s) may be used.

As described above, the present invention is explained by way of Embodiments 1 to 4. However, the present invention is not limited to Embodiments 1 to 4. It is understood that the scope of the present invention is determined solely by the appended claims. According to the description of detailed preferable embodiments 1 to 4 of the present invention, it is understood that those skilled in the art is enabled to make and use the equal scope of the present invention based on the description of the present invention and technical common sense. The entire contents of any patent, patent publication and reference cited in the specification should be incorporated herein by reference in the like manner as the contents are specifically described in the specification.

As described above, the present invention prevents the edge portions of the amorphous transparent conductive layer (second conductive metal layer) for forming the reflecting electrode from coming off in later steps such as rubbing. Therefore, the present invention is useful for the manufacture of an active matrix substrate including the reflecting electrode.

In the fields of a liquid crystal display used as a display screen in various electronic information equipment, for example, mobile equipment such as PDAs, cellular phones and digital still cameras, AV equipment such as television sets and OA equipment such as personal computers and a method for manufacturing the liquid crystal display, as well as an electrode wiring substrate (conductive element substrate) suitably used for the liquid crystal display and the manufacturing method thereof, the present invention allows etching a metal layer including a plurality of layers having different etch rates formed on a substrate using two different etchants, thereby providing an electrode and/or wire which is patterned to have a cross section which is substantially tapered upward from the closest layer to the substrate. Thus, the resulting electrode/wire is given with high film strength and resistance to coming off of the layer. As a result, failures such as leakage or a break in wire caused by coming off of the layer are reduced. Therefore, the electrode wiring substrate (conductive element substrate) and the liquid crystal display are manufactured with higher yield. The present invention is applicable to various kinds of electronic information equipment, for example, mobile equipment such as PDAs, cellular phones and digital still cameras, AV equipment such as television sets and OA equipment such as personal computers. The electronic information equipment of high reliability is manufactured with high yield.

What is claimed is:

1. A method for manufacturing a conductive element substrate comprising:
   (a) a laminated conductive film formation step of sequentially forming a first conductive metal film which is made of one or more metal layers and a second conductive metal film which is lower in etch rate than the first conductive metal film on a substrate to form a laminated conductive film; and
   (b) a conductive element formation step of patterning the laminated conductive film into a conductive element, wherein
   in the step (b), the laminated conductive film is etched at least twice using different etchants such that the second conductive metal film becomes narrower than the first conductive metal film when viewed in cross section, thereby making the cross section of the laminated conductive film substantially tapered upward from the closest conductive metal film to the substrate, wherein the step (b) includes a first etching step of etching the first conductive metal film and the second conductive metal film simultaneously and a second etching step of etching the second conductive metal film only, said first and second etching steps being performed using a single masking pattern, wherein
   the second conductive metal film is an amorphous transparent conductive film, made of a compound of indium oxide and zinc oxide and etched with an aqueous oxalic acid solution in the second etching step.

2. A method according to claim 1, wherein the second etching step is carried out after the first etching step.

3. A method according to claim 1, wherein
   in the step (a), the first conductive metal film is formed so as to cover a transparent electrode, and
   the first etching step is carried out after the second etching step.

4. A method according to claim 1, wherein
   the first etching step includes showering an etchant onto the laminated conductive film in the thickness direction of the laminated conductive film to allow the etchant to adhere to the laminated conductive film.

5. A method according to claim 1, wherein
   the second etching step is carried out by at least one of the treatments of: dipping the substrate provided with the first conductive metal film and the second conductive metal film into an etchant; and showering the etchant onto the substrate.

6. A conductive element substrate comprising: a conductive element including a first conductive metal layer which is made of one or more metal layers formed on a substrate and a second conductive metal layer which is formed on the first conductive metal layer and lower in etch rate than the first conductive metal layer, wherein the first conductive metal layer and the second conductive metal layer are so configured that the second conductive metal layer becomes narrower than the first conductive metal layer when viewed in cross section, thereby making the cross section of the conductive element substantially tapered upward from the closest conductive metal layer to the substrate, wherein the first conductive metal layer and the second conductive metal layer are etched simultaneously in a first etching step, and the second conductive metal layer exclusively is etched in a second etching step, wherein the first conductive metal layer which is made of one or more metal layers includes at least one of a molybdenum layer and an aluminum layer, and the second conductive metal layer is an amorphous transparent conductive layer, made of a compound of indium oxide and zinc oxide and etched with an aqueous oxalic acid solution in the second etching step.

7. A method for manufacturing a liquid crystal display comprising a pair of substrates opposed to each other and a liquid crystal layer sandwiched between the substrates, the method comprising:
  (a) a laminated conductive film formation step of sequentially forming a first conductive metal film which is made of one or more metal layers and a second conductive metal film which is lower in etch rate than the first conductive metal film on at least one of the substrates to form a laminated conductive film; and
  (b) a conductive element formation step of patterning the laminated conductive film into a conductive element, wherein
  in the step (b), the laminated conductive film is etched at least twice using different etchants such that the second conductive metal film becomes narrower than the first conductive metal film when viewed in cross section, thereby making the cross section of the laminated conductive film substantially tapered upward from the closest conductive metal film to the substrate, wherein the step (b) includes a first etching step of etching the first conductive metal film and the second conductive metal film simultaneously and a second etching step of etching the second conductive metal film only, said first and second etching steps being performed using a single masking pattern, wherein
  the second conductive metal film is an amorphous transparent conductive film, made of a compound of indium oxide and zinc oxide and etched with an aqueous oxalic acid solution in the second etching step.

8. A method according to claim 7, wherein the second etching step is carried out after the first etching step.

9. A method according to claim 7, wherein in the step (a), the first conductive metal film is formed so as to cover a transparent electrode, and the first etching step is carried out after the second etching step.

10. A method according to claim 7, wherein the conductive element is a reflecting electrode.

11. A method according to claim 7, wherein the first etching step includes showering an etchant onto the laminated conductive film in the thickness direction of the laminated conductive film to allow the etchant to adhere to the laminated conductive film.

12. A method according to claim 7, wherein the second etching step is carried out by at least one of the treatments of: dipping the substrate provided with the first conductive metal film and the second conductive metal film into an etchant; and showering the etchant onto the substrate.

13. A method according to claim 7, wherein the step (a) includes a transparent electrode formation step of forming a transparent electrode on the substrate, and the first conductive metal film and the second conductive metal film are formed in this order to cover the transparent electrode to form the laminated conductive film.

14. A method according to claim 7, further comprising a photolithography step of patterning a resist film of a desired configuration on the second conductive metal film between the step (a) and the step (b), wherein the patterned resist film is used as a mask to perform the etching in the step (b).

15. A method according to claim 7, wherein a mixed solution of nitric acid, phosphoric acid, acetic acid and water is used in the first etching step.

16. A method according to claim 7, wherein the first conductive metal film includes a lower molybdenum film and an upper aluminum film.

17. A liquid crystal display comprising a pair of substrates opposed to each other and a liquid crystal layer sandwiched between the substrates, the liquid crystal display further comprising: a conductive element including a first conductive metal layer which is made of one or more metal layers formed on at least one of the substrates and a second conductive metal layer which is formed on the first conductive metal layer and lower in etch rate than the first conductive metal layer, wherein the first conductive metal layer and the second conductive metal layer are so configured that the second conductive metal layer becomes narrower than the first conductive metal layer when viewed in cross section, thereby making the cross section of the conductive element substantially tapered upward from the closest conductive metal layer to the substrate, wherein the first conductive metal layer and the second conductive metal layer are etched simultaneously in a first etching step, and the second conductive metal layer exclusively is etched in a second etching step, said first and second etching steps being performed using a single masking pattern, wherein the first conductive metal layer which is made of one or more metal layers includes at least one of a molybdenum layer and an aluminum layer, and the second conductive metal layer is an amorphous transparent conductive layer, made of a compound of indium oxide and zinc oxide and etched with an aqueous oxalic acid solution in the second etching step.

18. A liquid crystal display according to claim 17, wherein the first conductive metal layer includes a lower molybdenum layer and an upper aluminum layer.

19. A liquid crystal display according to claim 17, wherein a transparent electrode made of a compound of indium oxide and tin oxide is formed on one of the surfaces of the first conductive metal layer closer to the substrate.

20. Electronic information equipment which employs the liquid crystal display of claim 17 as a display screen.

* * * * *